(12) United States Patent
Bai et al.

(10) Patent No.: US 8,631,368 B2
(45) Date of Patent: Jan. 14, 2014

(54) METHOD AND CIRCUIT TO GENERATE RACE CONDITION TEST DATA AT MULTIPLE SUPPLY VOLTAGES

(75) Inventors: Xiaoliang Bai, SanDiego, CA (US); Xiaonan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/749,602

(22) Filed: Mar. 30, 2010

(65) Prior Publication Data
US 2011/0245948 A1  Oct. 6, 2011

(51) Int. Cl.
*G06F 17/50* (2006.01)

(52) U.S. Cl.
USPC .................... 716/113; 716/120; 716/136

(58) Field of Classification Search
None
See application file for complete search history.

(56) References Cited

U.S. PATENT DOCUMENTS

| | | | |
|---|---|---|---|
| 5,278,991 A | 1/1994 | Ramsdale et al. | |
| 5,822,697 A | 10/1998 | Matsuzawa | |
| 6,330,668 B1 | 12/2001 | Curiger et al. | |
| 6,360,264 B1 | 3/2002 | Rom | |
| 6,535,013 B2 | 3/2003 | Samaan | |
| 6,553,545 B1 | 4/2003 | Stinson et al. | |
| 6,621,302 B2 * | 9/2003 | Lowy et al. | 326/93 |
| 6,777,708 B1 | 8/2004 | Lin et al. | |
| 6,882,238 B2 | 4/2005 | Kurd et al. | |
| 6,975,608 B1 | 12/2005 | Park et al. | |
| 7,071,723 B2 | 7/2006 | Krishnamoorthy et al. | |
| 7,089,143 B2 * | 8/2006 | Foreman et al. | 702/125 |
| 7,187,599 B2 * | 3/2007 | Schnell et al. | 365/194 |
| 7,305,599 B1 | 12/2007 | Duce et al. | |
| 7,321,254 B2 | 1/2008 | Li et al. | |
| 7,461,305 B1 | 12/2008 | Klass et al. | |
| 7,541,829 B1 * | 6/2009 | Bolam et al. | 324/750.05 |
| 7,542,862 B2 * | 6/2009 | Singh et al. | 702/89 |
| 7,622,979 B2 * | 11/2009 | Bhatia et al. | 327/297 |
| 7,671,579 B1 * | 3/2010 | Chong et al. | 324/76.54 |
| 7,681,157 B2 * | 3/2010 | Buck et al. | 716/113 |
| 7,884,619 B1 * | 2/2011 | Chong et al. | 324/601 |
| 8,031,735 B2 | 10/2011 | Kuo | |
| 8,040,849 B2 | 10/2011 | Mudigonda et al. | |
| 8,143,910 B2 * | 3/2012 | Kobatake | 324/765.01 |
| 8,175,069 B2 | 5/2012 | Wang et al. | |
| 2003/0231612 A1 | 12/2003 | Kim et al. | |

(Continued)

FOREIGN PATENT DOCUMENTS

WO   WO2009090516 A1   7/2009

OTHER PUBLICATIONS

International Search Report and Written Opinion—PCT/US2011/030356, ISA/EPO—Oct. 17, 2011.

(Continued)

*Primary Examiner* — Leigh Garbowski
(74) *Attorney, Agent, or Firm* — Sam Talpalatsky; Nicholas J. Pauley; Joseph Agusta

(57) ABSTRACT

A method and circuit for characterizing a process variation of a semiconductor die is disclosed. In a particular embodiment, the method includes operating a circuit at multiple supply voltage levels to generate race condition testing data. The circuit is disposed on at least one die of a wafer and includes at least one racing path circuit having at least two paths. The method further includes collecting the race condition testing data and evaluating the collected race condition testing data. The race condition testing data is correlated to a process variation of the at least one die.

46 Claims, 12 Drawing Sheets

(56) References Cited

U.S. PATENT DOCUMENTS

| | | |
|---|---|---|
| 2004/0033805 A1 | 2/2004 | Verma et al. |
| 2006/0035639 A1 | 2/2006 | Etemad et al. |
| 2006/0084439 A1 | 4/2006 | Joshi et al. |
| 2007/0191018 A1 | 8/2007 | Terry |
| 2008/0209375 A1* | 8/2008 | Buck et al. ................ 716/6 |
| 2008/0288197 A1 | 11/2008 | Singh et al. |
| 2010/0283051 A1* | 11/2010 | Mayor .................. 257/48 |
| 2011/0243051 A1 | 10/2011 | Kenchareddy et al. |

OTHER PUBLICATIONS

Drake, Alan et al. "A Distributed Critical-Path Timing Monitor for a 65nm High-Performance Microprocessor," 2007 IEEE International Solid-State Circuits Conference, Session 22, Digital Circuit Innovations, pp. 398-399.

Mukhopadhyay, Saibal et al. "An On-Chip Test Structure and Digital Measurement Method for Statistical Characterization of Local Random Variability in a Process," IEEE Journal of Solid-State Circuits, vol. 43, No. 9, Sep. 2008, pp. 1951-1963.

* cited by examiner

METHOD AND CIRCUIT TO GENERATE RACE CONDITION TEST DATA AT MULTIPLE SUPPLY VOLTAGES

I. FIELD

The present disclosure is generally related to a method and circuit for characterizing a process variation of a semiconductor die.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

The effect of random local process variation becomes more and more prominent as manufacturing processes with smaller dimensions are used to fabricate semiconductor devices. To reduce the dynamic and leakage power in low power designs, small transistors and reduced supply voltages are used. However, small transistors and reduced supply voltages lead to larger random time variations. When large random time variations occur, circuits may fail. Local random process variation is one of the causes of timing failure. Large local random process variation can cause yield loss for low power designs.

III. SUMMARY

Semiconductor circuits with racing paths have a timing margin that defines a minimum delay difference between two signals (e.g., data signal and clock signal) to avoid a race condition. The timing margin may be exceeded as a result of timing variation caused by process variation in a semiconductor die, variation in power supply voltage level, and variation in ambient or local temperature. Taking advantage of the timing sensitivity to process variation and supply voltage level variation, a test circuit including a racing path circuit may be used to monitor process variation. The test circuit may include a data path signal, a clock path signal, and a pass gate. The data path may be designed to be faster than the clock path so that the data signal can pass through the pass gate. However, when process variation and supply voltage variation are present, the clock path may become faster than the data path. In this situation, a race condition occurs and the pass gate may be closed by the clock signal before the data signal passes through the pass gate. Since the supply voltage of the test circuit may be controlled, the process variation may be monitored and characterized by adjusting the supply voltage to determine the approximate voltage at which the race condition occurs.

In a particular embodiment, the method includes operating a circuit at multiple supply voltage levels to generate race condition testing data. The circuit is disposed on at least one die of a wafer and includes at least one racing path circuit having at least two paths. The method also includes collecting the race condition testing data. The method further includes evaluating the collected race condition testing data. The race condition testing data is correlated to a process variation of the at least one die.

In another particular embodiment, a method is disclosed. The method includes fabricating a wafer including multiple dies. At least two of the multiple dies define a scribe line. The method also includes disposing a plurality of racing path circuits in proximity to the scribe line. At least one racing path circuit includes at least two paths and is configured to operate at multiple supply voltage levels to generate race condition testing data.

In another particular embodiment, a circuit is disclosed that includes at least one racing path circuit comprising a first path including at least one gate delay element and a second path including at least one more gate delay element than the first path. The at least one racing path circuit further includes a pass gate coupled to the first path and to the second path. The at least one racing path circuit is configured such that a signal applied to the first path and to the second path race to the pass gate while a supply voltage is applied to the at least one racing path circuit. The at least one racing path circuit is a component of a ring oscillator that is operable in an oscillation state at a first supply voltage and is in a non-oscillation state at a second supply voltage.

One particular advantage provided by at least one of the disclosed embodiments is that an approximate supply voltage level at which a race condition occurs may be detected and used to derive or characterize local process variation. Thus, an enhanced method of measuring and characterizing process variation is provided.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
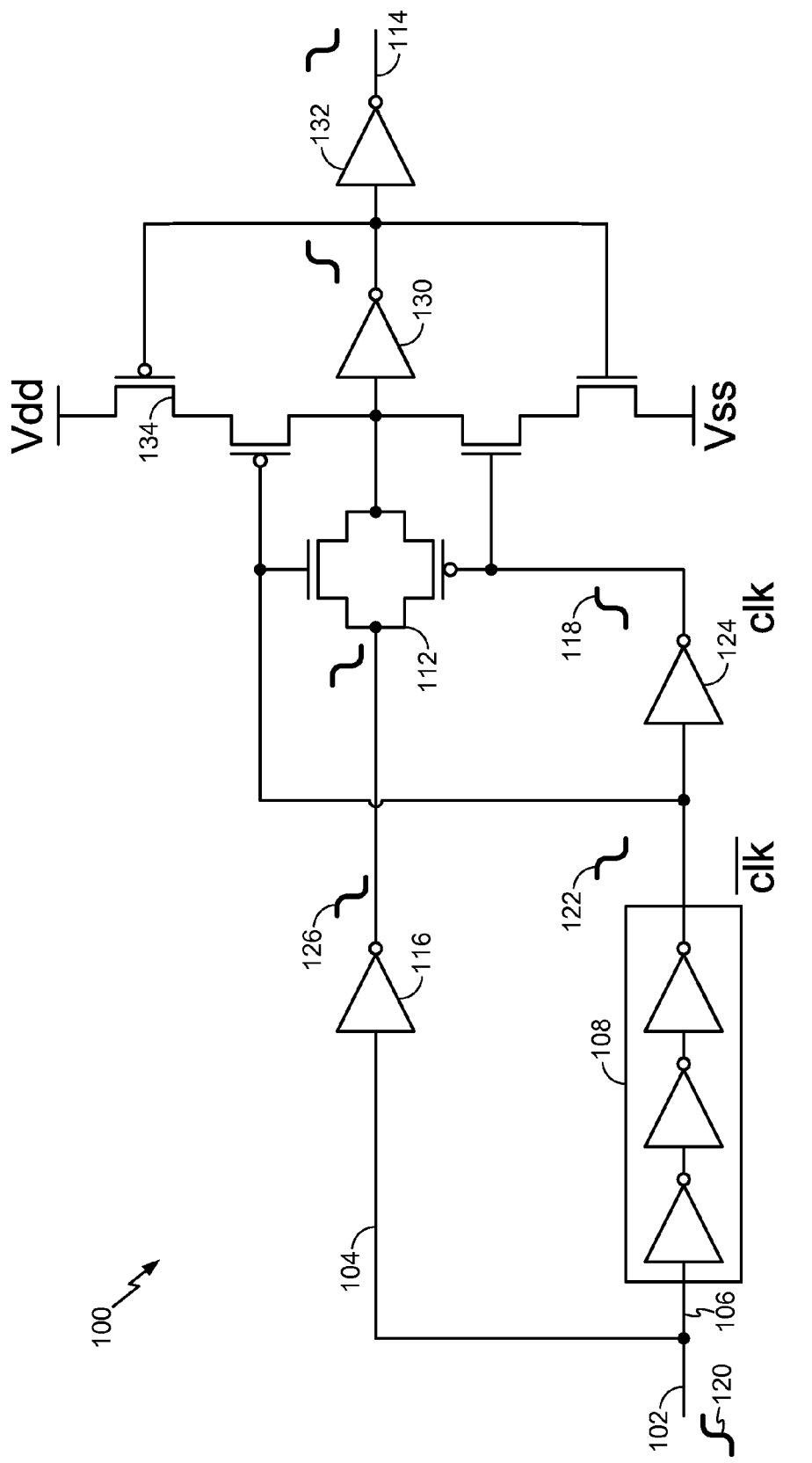
FIG. 1 is a circuit diagram of a particular illustrative embodiment of a racing path circuit.

Referring to FIG. 1, a particular illustrative embodiment of a circuit is illustrated. The circuit includes a racing path circuit 100 as illustrated. The racing path circuit 100 includes a first path 104 and a second path 106. The first path 104 includes at least one delay element such as gate delay element 116. The second path 106 includes multiple delay elements. For example, the second path 106 includes multiple gate delay elements within delay circuitry 108. In a particular illustrative embodiment, the second path 106 includes at least one more gate delay element than the first path 104. For example, the second path 106 may include two gate delay circuits within the delay circuitry 108, whereas the first path 104 includes a single gate delay element 116. The gate delay element 116 and the gate delay elements contained within the delay circuitry 108 may include an inverter, a non-inverting buffer, or any other type of delay element configured to delay a signal sent over the first path 104 and the second path 106.

The racing path circuit 100 further includes a pass gate 112. The pass gate 112 is coupled to the first path 104 and the second path 106. The racing path circuit 100 further includes additional circuitry. For example, the racing path circuit 100 includes multiple inverters, a positive voltage supply Vdd, a negative voltage supply Vss, and an output stage coupled via an output inverter to a resulting output 114 of the racing path circuit 100. While particular circuitry is shown with respect to FIG. 1, it should be understood that the racing path circuit 100 may include more elements or fewer elements than shown.

During operation, an input signal 120 is received at an input 102 of the racing path circuit 100 and is provided to the first path 104 and the second path 106. An example of an input signal 120 is a digital signal that has a rising transition, such as the rising transition illustrated in FIG. 1. The input signal 120 is received at the first path 104 and at the second path 106. The input signal 120 is delayed by the first gate delay element 116 of the first path 104. In a particular embodiment as shown in FIG. 1, the first gate delay element 116 is an inverter and the output of the inverter 116 is an inverted version of the input signal 120.

Upon receipt of the input signal 120 at the second path 106, the input signal 120 is provided to the delay circuitry 108. In a particular embodiment as shown in FIG. 1, the delay circuitry 108 includes three serially coupled inverters such that the result of applying the input signal 120 to the delay circuitry 108 is an inverted output signal that may represent an inverted clock signal 122. The inverted clock signal 122 is provided to the pass gate 112 and to an additional inverter 124 to produce a clock signal 118. The clock signal 118 is a delayed version of the input signal 120, and the clock signal 118 is provided to the pass gate 112 as shown. The output of the first delay element 116 is also provided to the pass gate 112. Thus, when the input signal 120 is provided to both the first path 104 and the second path 106, a race situation occurs in which the signal propagating down the first path 104 and the signal propagating down the second path 106 race to the pass gate 112.

The pass gate 112 that is coupled to both the first path 104 and to the second path 106 is configured such that the input signal 120 applied to the first path 104 and to the second path 106 race to the pass gate 112 while a supply voltage, such as the supply voltage Vdd, is applied to the circuit elements of the racing path circuit 100. In a particular embodiment, the negative voltage supply Vss may be grounded and the voltage Vdd may be a positive supply voltage. Alternatively, the voltage Vdd may be grounded and the voltage Vss may be a negative supply voltage. In either configuration, a voltage is provided to the circuit elements of the racing path circuit 100 to enable operation of the racing path circuit 100. After receiving the input signals from the first path 104 and the second path 106, the pass gate 112 allows the signal from the first path 104 to propagate to an inverter 130 as long as a race condition is not present. The inverter 130 provides a replication of the received signal which is a delayed version of the input signal 120. An output of the inverter 130 is provided to an input of a tri-state inverter 134 whose output is coupled to the output of the pass gate 112 and to the input of the inverter 130. The output of the inverter 130 is also provided to an additional inverter 132 that provides the output signal to the output 114 of the racing path circuit 100. Thus, the output signal at the output 114 is an inverted and delayed version of the input signal 120 in the absence of a race condition.

Thus, the racing path circuit 100 includes multiple paths 104, 106 where an input signal may be applied to the multiple paths concurrently. The signal applied to the multiple paths race to a pass gate which in turn provides an output signal. The racing path circuit 100 thus has multiple paths where each path has a different number of delay elements and a pass gate that is coupled to each of the multiple paths. The racing path circuit 100, as illustrated in FIG. 1, is configured to test the rising transition of the input signal 120 applied to the input 102 as will be explained further with respect to FIG. 1.

In a particular embodiment, the at least two paths of the racing path circuit include a data path and a control path provided to a pass gate. As an example, the data path may be the first path 104 of the racing path circuit 100 of FIG. 1 and the control path may be the second path 106 of the racing path circuit 100. The first data path 104 may be a data path, and the second path 106 may function as a control path and carries the clock signal.

In a further example, a falling transition of an input signal sent via the at least two paths of the racing circuit passes through the racing path circuit 100 of FIG. 1. For example, a falling transition of an input signal 120 sent via the data path 104 passes through the racing path circuit 100 regardless of whether a race condition occurs. Further, a rising transition of the input signal sent via the at least two paths does not pass through the racing path circuit 100 when the race condition occurs. For example, the rising transition of the input signal 120 sent via the first data path 104 of the racing path circuit 100 may be blocked such that it does not pass through the racing path circuit 100 upon occurrence of a race condition. As a further example, the clock signal from the inverter 124 may arrive at the pass gate 112 prior to, or too close in time to, the receipt of the output of the inverter 116 at the pass gate 112. When the input signal 120 has a rising transition, the clock signal from the inverter 124 disables the pass gate 112, thereby blocking the output of the inverter 116 from passing through the pass gate 112. Thus, a rising transition of the input signal sent over the data path 104 may not pass through the racing path circuit 100 because a race condition has occurred.

Alternatively, when a rising transition of an input signal is sent via the two paths of the racing circuit, the rising transition may pass through at least one racing path circuit. For example, when the rising transition of the input signal 120 of FIG. 1 is propagated over the first path 104 and the output of the inverter 116 arrives at the pass gate 112 prior to a clock transition from the inverter 124, a race condition has not occurred and the data from the inverter 116 may successfully pass through the pass gate 112. Thus, a rising transition of the data signal sent via the data path 104 successfully passes through the racing circuit 100 when a race condition does not occur.

Referring to FIG. 1, even though the first path 104 has fewer gate delay elements than the second path 106, under certain conditions the signal propagated over the second path 106 may arrive before, or too close in time to, the signal propagated over the first path 104 thus causing a race condition. The signal arriving sooner over the second path 106 is caused by process variations that may occur on the same die or across multiple dies. The effects of process variation can become more pronounced as the gate sizes or device size is reduced, as the supply voltage to the circuit elements is reduced, or a combination thereof. When a race condition occurs as a result of a decrease in supply voltage, the signal on the first path 104 will not pass through the racing path circuit 100 when the digital signal 120 applied to the input 102 has a rising transition. The output 114 may be monitored to determine when a race condition occurs by detecting a failure of the output signal to transition appropriately when a rising transition is applied to the input 102. The racing path circuit 100 detects a race condition on a rising transition, but allows a falling transition to pass through the racing path circuit 100 despite the race condition.

Multiple supply voltage levels may be applied to the racing path circuit 100 to determine an approximate supply voltage at which a race condition will occur. For example, for an initial test of multiple tests, a voltage level of 1.0 volt may be applied to the positive power supply Vdd and Vss is grounded. A digital signal 120 having a rising transition is applied to input 102. The output 114 is then monitored to determine whether a race condition has occurred. If a race condition has not occurred, the positive power supply voltage Vdd may be lowered in increments to determine a voltage level at which a race condition occurs. For example, the supply voltage may be lowered in 100 millivolt (mV) increments resulting in a supply voltage of 0.9 volts for the second test. Assuming that a race condition does not occur at 0.9 volts, the supply voltage is then lowered to 0.8 volts. With the supply voltage set at 0.8 volts, a digital input signal 120 having a rising transition may be applied to the input 102 of the racing path circuit 100 and the output 114 is monitored to determine whether a race condition has occurred. In a particular example, the signal on the output 114 does not transition appropriately with a supply voltage at 0.8 volts that indicates that a race condition has occurred. Thus, the approximate supply voltage at which a race condition will occur in this particular example is in a range between 0.8 volts and 0.9 volts.

The supply voltage may be lowered by any voltage increment to determine an approximate supply voltage level at which the race condition occurs. For example, the supply voltage may be lowered in increments of 200 mV, 100 mV, 50 mV, 10 mV, or 1 mV as illustrative non-limiting examples. A smaller increment may be used to determine a closer approximation of the supply voltage at which a race condition occurs for a particular racing path circuit.

In a particular embodiment, the size of the increments by which the supply voltage level is lowered is reduced in multiple test stages. For example, the first test stage may lower the supply voltage in 200 mV increments until it is determined that the race condition occurs between 0.8 volts and 0.6 volts. In a second test stage, the supply voltage level is set to 0.8 volts and lowered by increments of 100 mV until it is determined that the race condition occurs between 0.7 volts and 0.6 volts. In a third test stage, the supply voltage level is set to 0.7 volts and lowered by increments of 50 mV until it is determined that the race condition occurs between 0.65 volts and 0.6 volts. In a fourth test stage, the supply voltage level is set to 0.65 volts and lowered by increments of 10 mV until it is determined that the race condition occurs between 0.65 volts and 0.64 volts. This process may be continued to whatever level of granularity is desired for the approximation of the supply voltage at which the race condition occurs.

Figure 2:
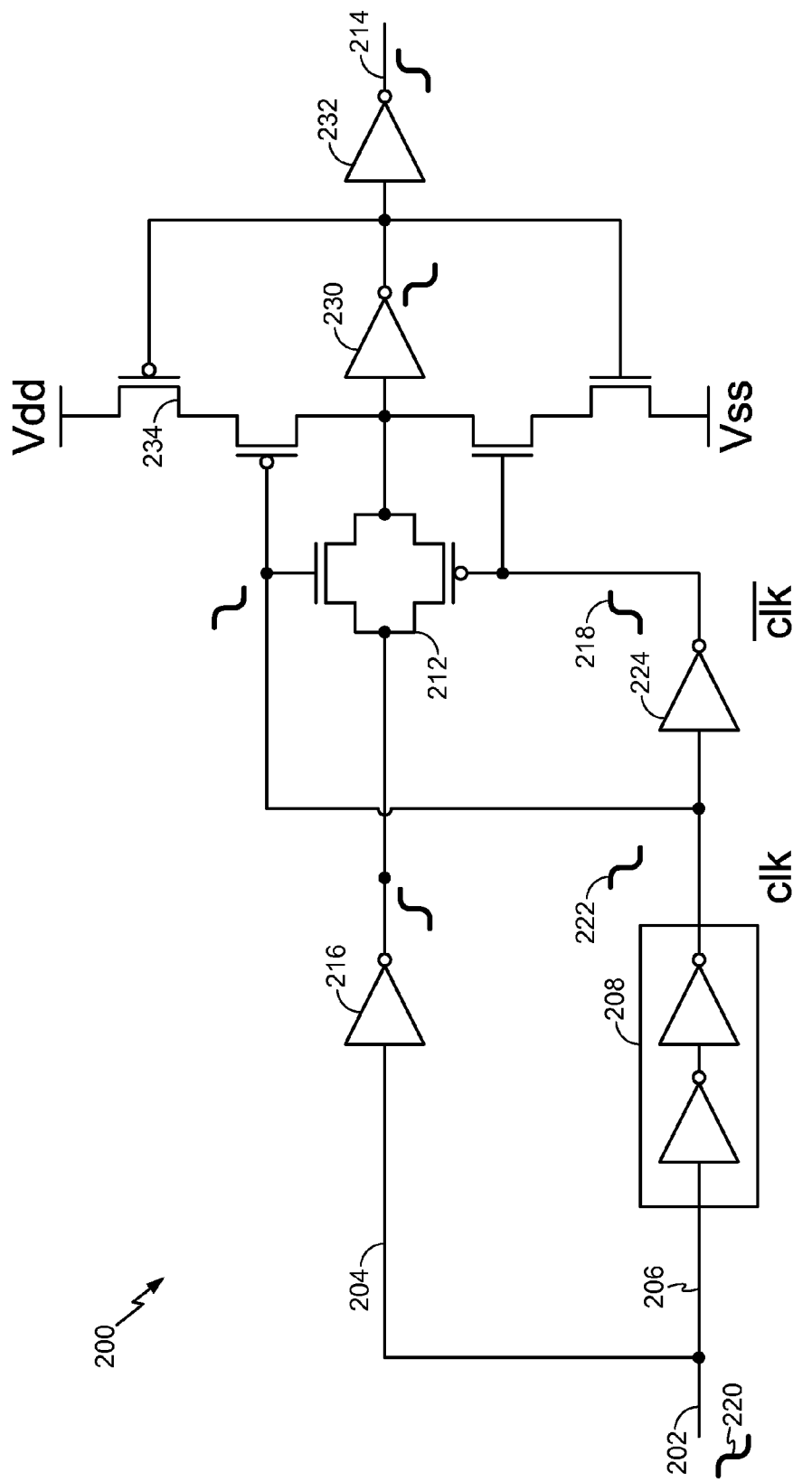
FIG. 2 is a circuit diagram of a second illustrative embodiment of a racing path circuit.

FIG. 2 illustrates a racing path circuit 200 that is similar to the racing path circuit 100. The racing path circuit 200 includes a first path 204 and a second path 206. The first path 204 includes at least one delay element such as gate delay element 216. The second path 206 includes multiple delay elements. For example, the second path 206 includes multiple gate delay elements within the delay circuitry 208. In a particular illustrative embodiment, the second path 206 includes at least one more gate delay element than the first path 204. For example, the second path 206 may include two gate delay elements within the delay circuitry 208, whereas the first path 204 includes a single gate delay element 216. The gate delay element 216 and the gate delay elements contained within the delay circuitry 208 may include an inverter, a non-inverting buffer, or any other type of delay element configured to delay a signal sent over the first path 204 and the second path 206.

The racing circuit 200 further includes a pass gate 212. The pass gate 212 is coupled to the first path 204 and the second path 206. The racing path circuit 200 further includes additional circuitry. For example, the racing path circuit 200 includes multiple inverters, a positive voltage supply Vdd, a negative voltage supply Vss, and an output stage coupled via an output inverter to a resulting output 214. While particular circuitry is shown with respect to FIG. 2, it should be understood that the racing path circuit 200 may include more elements or fewer elements than shown.

During operation, an input signal 220 is received at the input 202 of the racing path circuit 200 and the input signal 220 is provided to both the first path 204 and the second path 206. An example of an input signal 220 is a digital signal that has a falling transition, such as the falling transition illustrated in FIG. 2. The input signal 220 is received at the first path 204 and at the second path 206. The input signal 220 is delayed by the first gate delay element 216 of the first path 204. In a particular embodiment as shown in FIG. 2, the first gate delay element 216 is an inverter and the output of the inverter 216 is an inverted version of the input signal 220.

Upon receipt of the input signal 220 at the second path 206, the input signal 220 is provided to the delay circuitry 208. In a particular embodiment as shown in FIG. 2, the delay circuitry 208 includes two serially coupled inverters such that the result of applying the input signal 220 to the delay circuitry 208 is a non-inverted output signal that may represent a clock signal 222. The clock signal 222 is provided to the pass gate 212 and to an additional inverter 224 to produce an inverted clock signal 218. The inverted clock signal 218 is a delayed and inverted version of the input signal 220, and the inverted clock signal 218 is provided to the pass gate 212 as shown. The output of the first delay element 216 is also provided to the pass gate 212. Thus, when an input signal 220 is provided to both the first path 204 and the second path 206, a race condition occurs in which the signal propagating down the first path 204 and the signal propagating down the second path 206 race to the pass gate 212.

The pass gate 212 that is coupled to both the first path 204 and to the second path 206 is configured such that the input signal 220 applied to the first path 204 and to the second path 206 race to the pass gate 212 while a supply voltage, such as the supply voltage Vdd, is applied to the circuit elements of the racing path circuit 200. In a particular embodiment, the negative voltage supply Vss may be grounded and the voltage Vdd may be a positive supply voltage. Alternatively, the voltage Vdd may be grounded and the voltage Vss may be a negative supply voltage. In either configuration, a voltage is provided to the circuit elements of the racing path circuit 200 to enable operation of the racing path circuit 200. After receiving the input signals from the first path 204 and the second path 206, the pass gate 212 allows the signal from the first path 204 to propagate via an output stage to an inverter 230 as long as a race condition is not present. The inverter 230 provides a replication of the received signal which is a delayed version of the input signal 220. An output of the inverter 230 is provided to an input of a tri-state inverter 234 whose output is coupled to the output of the pass gate 212 and to the input of the inverter 230. The output of the inverter 230 is also provided to an additional inverter 232 which provides the output signal to the output 214 of the racing path circuit 200. Thus, the output signal provided at the output 214 of the racing path circuit 200 is an inverted and delayed version of the input signal 220 in the absence of a race condition.

In contrast to FIG. 1, the output of the delay circuitry 208 along the second path 206 is a delayed version of the input signal 220, whereas the output of the delay circuitry 108 of the racing path circuit 100 along the first path 106 is a delayed inverted version of the input signal 120. Thus, in FIG. 2, the clock signals that are applied to the pass gate 212 are inverted from the clock signals applied to the pass gate 112 in FIG. 1. The inversion of the clock signal may occur by adding or removing an inverter circuit element to or from the delay circuitry 208 as compared to the delay circuitry 108 of FIG. 1. The racing path circuit 200 includes multiple paths 204, 206 and an input signal may be applied to the multiple paths concurrently. The signal applied to the multiple paths race to a pass gate which in turn provides an output signal. The racing path circuit 200 thus has multiple paths where each path has a different number of delay elements, and a pass gate that is coupled to each of the multiple paths. The racing path circuit 200, as illustrated in FIG. 2, is configured to test a falling transition of the input signal 220 applied to input 202.

In a particular embodiment, the at least two paths of the racing path circuit include a data path and a control path provided to a pass gate. As an example, the data path may be the first path 204 of the racing path circuit 200 of FIG. 2, and the control path may be the second path 206 of the racing path circuit 200. The first data path 204 may therefore be a data path, and the second path 206 may function as a control path and carries the clock signal.

In a further example, referring to FIG. 2, a rising transition of an input signal sent via the at least two paths of the racing path circuit passes through the racing path circuit 200. For example, a rising transition of an input signal 220 sent via the first path 204 passes through the racing path circuit 200 regardless of whether a race condition occurs. However, a falling transition of the input signal sent via the at least two paths does not pass through the racing path circuit 200 when the race condition occurs. For example, the rising transition of the input signal 220 sent via the first path 204 of the racing path circuit 200 may be blocked such that it does not pass through the racing path circuit upon occurrence of a race condition. As a further example, the clock signal 222 and the inverted clock signal from the inverter 224 may arrive at the pass gate 212 prior to, or too close in time to, the receipt of the output of the inverter 216 at the pass gate 212. When the input signal 220 has a falling transition, the clock signals, 222 and 224, disable the pass gate 212, thereby blocking the output of the inverter 216 from passing through the pass gate 212. Thus, a falling transition of the input signal sent over the first path 204 may not pass through the racing path circuit 200 because a race condition has occurred.

Alternatively, when a race condition does not occur, a falling transition of an input signal sent via the two paths of the racing circuit passes through the at least one racing path circuit. For example, when the falling transition of the input signal 220 is propagated over the first path 204, and the output of the inverter 216 arrives at the pass gate 212 prior to the clock signals 222 and 224, a race condition has not occurred and the signal from the inverter 216 may successfully pass through the pass gate 212. Thus, a falling transition of the data signal sent via the data path 204 successfully passes through the racing path circuit 200 when a race condition does not occur.

Figure 3:
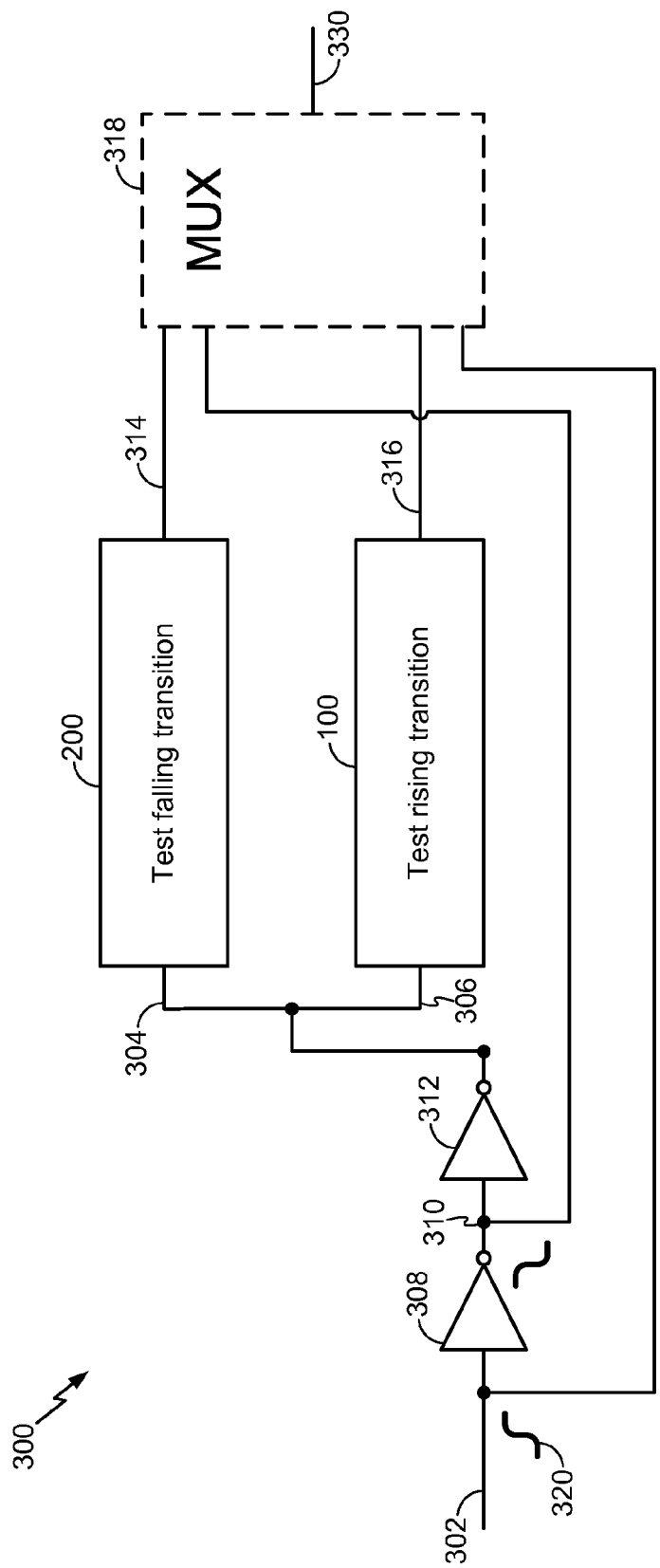
FIG. 3 is a circuit diagram of a third illustrative embodiment of a racing path circuit.

FIG. 3 illustrates a racing path circuit 300 that combines the racing path circuit 100 of FIG. 1 and the racing path circuit 200 of FIG. 2. The racing path circuit 300 includes an input 302 that is coupled to a first input of a multiplexer 318. The input 302 is also provided to an inverter 308. The output 310 of the inverter 308 is coupled to a second input of the multiplexer 318. The output 310 of the inverter 308 is also provided to an inverter 312. The output of the inverter 312 is coupled to the input 304 of the racing path circuit 200 and to the input 306 of the racing path circuit 100. The output 314 of the racing path circuit 200 is provided to a third input of the multiplexer 318, and the output 316 of the racing path circuit 100 is provided to a fourth input of the multiplexer 318. The multiplexer 318 is configured to select one of the multiplexer inputs to provide an output 330 of the racing path circuit 300. By combining the racing path circuits 100 and 200, the racing path circuit 300 is capable of testing both a rising and falling transition of an input signal 320 applied to the input 302. The multiplexer 318 also allows the racing path circuit 300 to bypass the racing path circuitry to provide either a non-inverted or an inverted version of the input signal 302 at the output 330 of the racing path circuit 300.

In a further example, referring to FIG. 3, an input signal is applied to, and passed through to a multiplexer of the racing path circuit 300. For example, an input signal 320 is applied to the input 302 and provided to a first input of the multiplexer 318. An inverted version of the input signal 320 is provided from the output 310 of the inverter 308 to a second input of the multiplexer 318. A delayed version of the input signal 320 is provided to the input 304 of the racing path circuit 200 and the input 306 of the racing path circuit 100. The racing path circuits 100 and 200 function as described above with respect to FIGS. 1 and 2. For example, when a race condition is present in the racing path circuits 100 and 200, and the input signal 320 has a falling transition, the signal applied to the input 304 of the racing path circuit 200 does not pass through to the output 314. When the input signal 320 has a falling transition, the signal applied to the input 306 of the racing path circuit 100 will pass through to the output 316 regardless of whether there is a race condition. Thus, a race condition is detectable on a falling transition of the input signal 320 on the output 314 of the racing path circuit 200. The multiplexer 318 may be configured to provide at its output 330, the output 314 of the racing path circuit 200 when the input signal 320 has a falling transition.

Additionally, when a race condition is present in the racing path circuits 100 and 200, and the input signal 320 has a rising transition, the signal applied to the input 306 of the racing path circuit 100 does not pass through to the output 316. When the input signal 320 has a rising transition, the signal applied to the input of the racing path circuit 200 will pass through to the output 314 regardless of whether there is a race condition. Thus, a race condition is detectable on a rising transition of the input signal 320 on the output 316 of the racing path circuit 100. Even though this example describes a race condition being present in both the racing path circuit 100 and the racing path circuit 200, it is to be understood that a race condition may be present in one racing path circuit but not the other. For example, a race condition may occur in the racing path circuit 100 at a first supply voltage level while a race condition may occur in the racing path circuit 200 at a second supply voltage where the first supply voltage is different than the second supply voltage and the first supply voltage is applied at the same time as, or at a different time from, the second supply voltage.

The multiplexer 318 may be configured to provide at its output 330, the output 316 of the racing path circuit 100 when the input signal 320 has a rising transition. The multiplexer 318 may also be configured to bypass the racing path circuits 100 and 200 of FIG. 3 and provide the digital signal 320 on the output 330 of the multiplexer 318 or an inverted version of the digital input signal 320 on the output 330 of the multiplexer 318. These two bypass options may be useful when using the racing path circuit 300 in various test configurations (e.g., a ring oscillator configuration as shown in FIGS. 4 and 5).

Figure 4:
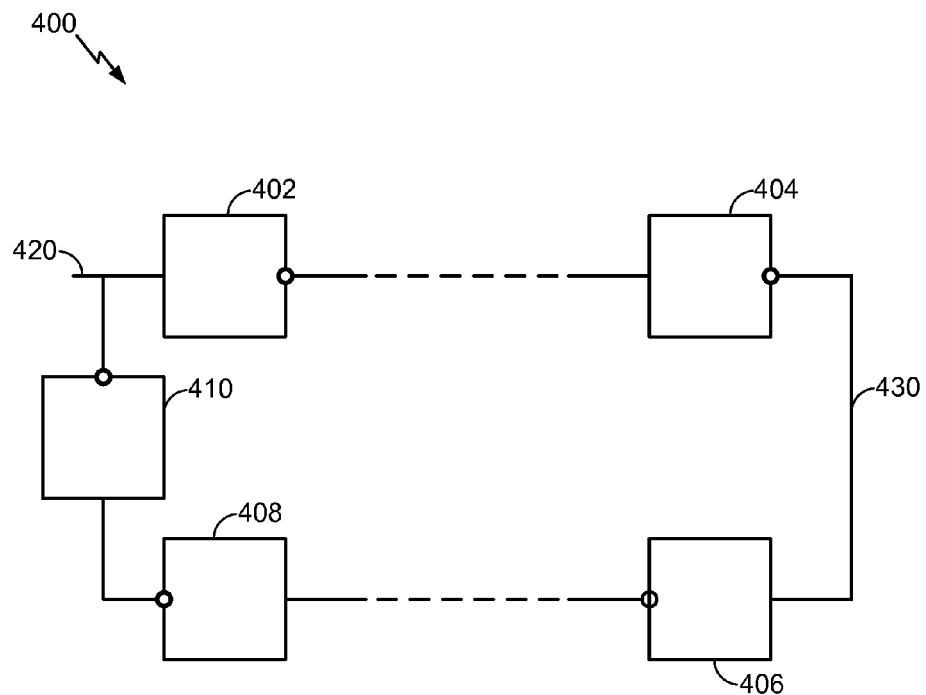
FIG. 4 is a diagram of a particular illustrative embodiment of a ring oscillator configuration.
Figure 5:
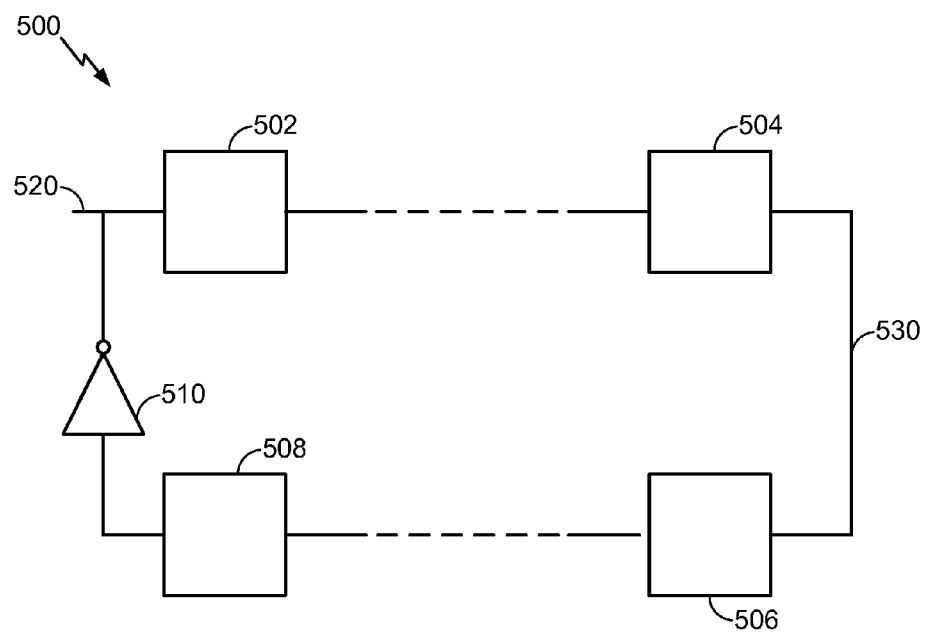
FIG. 5 is a diagram of a second illustrative embodiment of a ring oscillator configuration.

Referring to FIG. 4, in a particular embodiment, racing path circuits are disposed in a ring oscillator configuration 400 with an input 420 and an output 430. For example, one or more of the racing path circuits 402, 404, 406, 408, and 410 may be the racing path circuit 100 of FIG. 1, the racing path circuit 200 of FIG. 2, the racing path circuit 300 of FIG. 3, or a combination of the racing path circuits 100, 200, and 300. The ring oscillator configuration 400 may indicate an oscillating state at a first supply voltage and may indicate a non-oscillating state at a second supply voltage, where the non-oscillating state at the second supply voltage indicates a race condition. Thus, the supply voltage and the testable oscillating state, may be used to identify race conditions corresponding to process variation. As a particular example, outputs of the each of the plurality of racing circuits 402, 404, 406, 408, and 410 may be inverted, such as in the ring oscillator configuration 400.

The plurality of racing path circuits in the ring oscillator configuration 400 may be operated at multiple supply voltage levels. Operation at multiple supply voltage levels may be performed to generate and measure test data that may be evaluated to identify and characterize the process variation. As an example, operation at multiple supply voltage levels can include iteratively reducing the supply voltage until a non-oscillating state is reached or increasing a supply voltage until an oscillating state is achieved. The result of this operation provides an approximate voltage level at which a race condition occurs that may be used to derive or characterize local process variation. Thus, the ring oscillator configuration 400 enables an enhanced method of measuring or characterizing process variation.

In a particular illustrative embodiment, the supply voltage levels of each of the plurality of racing path circuits 402, 404, 406, 408, and 410 may be applied independently to its respective racing path circuit in order to isolate and determine the voltage level at which that particular racing path circuit causes the ring oscillator to fail due to a race condition. For example, the supply voltage level for the racing path circuits 404, 406, 408, and 410 may be held constant at 1.1 volts or to some other level to ensure that a race condition does not occur at the racing path circuits 404, 406, 408, and 410. The supply voltage of the racing path circuit 402 is initially set to the same supply voltage as the other racing path circuits. An input is applied to the ring oscillator at the input 420 and is set in an oscillating state. The supply voltage of the racing path circuit 402 is then iteratively reduced until a non-oscillating state is reached. The change in state may be determined by monitoring the output 430 of the ring oscillator. The non-oscillating state indicates that a race condition has occurred in the racing path circuit 402. An example of oscillating and non-oscillating states is described with respect to FIGS. 6 and 7.

The supply voltage level at which the race condition occurred can be collected and an approximate voltage level for a race condition of the racing path circuit 402 may be determined. The approximate voltage level may be correlated to a local process variation. Testing may be repeated for each of the remaining racing path circuits 404, 406, 408, and 410 individually and the approximate voltage levels at which the race conditions occur for each racing path circuit may be correlated to a local process variation.

Alternatively, or in addition, each of the racing path circuits 402, 404, 406, 408, and 410 in the ring oscillator configuration 400 may be individually isolated and tested, where each of the racing path circuits are configured according to racing path circuit 300 of FIG. 3. For example, the racing path circuit 402 may be isolated by configuring each of the remaining racing path circuits 404, 406, 408, and 410 to bypass its internal racing path circuitry and provide an inverted version of the input signal on its respective output. For example, each of the remaining racing path circuits may be configured so that the multiplexer 318 of FIG. 3 selects the input provided by the output 310 of the inverter 308. An input is applied to the ring oscillator input 420 and the ring oscillator is set in an oscillating state. The supply voltage of racing path circuit 402 is then adjusted to operate at multiple supply voltage levels until the ring oscillator enters a non-oscillating state. The change in state may be determined by monitoring the output 430 of the ring oscillator. The non-oscillating state indicates that a race condition has occurred in the racing path circuit 402. The supply voltage level at which the race condition occurred is collected and an approximate voltage level for a race condition of racing path circuit may be determined. The approximate voltage level is correlated to a local process variation. The test may then be repeated for each of the remaining racing path circuits 404, 406, 408, and 410 individually, and the approximate voltage levels at which the race conditions occur for each racing path circuit may be correlated to a local process variation.

Referring to FIG. 5, in a particular embodiment, racing path circuits are disposed in a ring oscillator configuration 500 having an input 520 and an output 530, where the racing path circuits in the configuration each have non-inverting outputs. For example, one or more of the racing path circuits 502, 504, 506, and 508 may be the racing path circuit 100 of FIG. 1 without an inverted output, the racing path circuit 200 of FIG. 2 without an inverted output, the racing path circuit 300 of FIG. 3 without an inverted output, or a combination of the racing path circuits 100, 200, and 300. The ring oscillator configuration 500 includes at least one inverter element to enable oscillation. For example, the ring oscillator may utilize an inverter 510, or, alternatively, one or more of the racing path circuits 502, 504, 506, and 508 may have an inverted output. The ring oscillator configuration 500 may indicate an oscillating state at a first supply voltage and may indicate a non-oscillating state at a second supply voltage, where the non-oscillating state at the second supply voltage indicates a race condition. Thus, the supply voltage and the testable oscillating state may be used to identify race conditions corresponding to process variation. As a particular example, the racing path circuits in the ring oscillator configuration 500 may be operated at multiple supply voltage levels as described with respect to FIG. 4. Operation at multiple supply voltage levels may be performed to generate and measure test data that may be evaluated to identify and characterize the process variation. As an example, operation at multiple supply voltage levels provides an approximate voltage level at which a race condition occurs and may be used to derive or characterize local process variation. Thus, the ring oscillator configuration 500 enables an enhanced method of measuring or characterizing process variation is described.

In a particular illustrative embodiment, the supply voltage levels of the plurality of racing path circuits 502, 504, 506, and 508 may be applied independently to its respective racing path circuit in order to isolate and determine the voltage level at which that particular racing path circuit causes the ring oscillator to fail due to a race condition according to the configuration described above with respect to oscillating circuit configuration 400 of FIG. 4.

Figure 6:
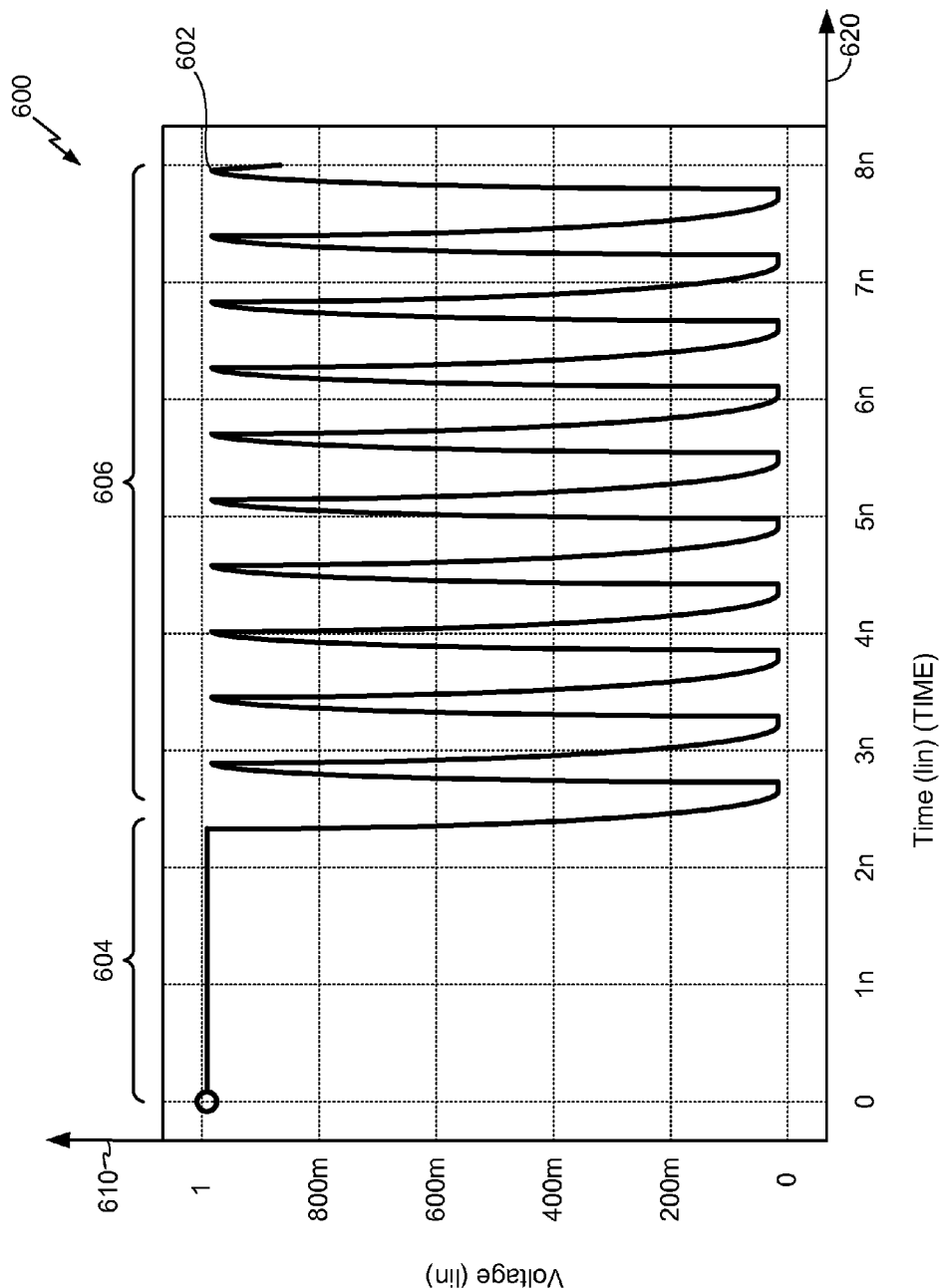
FIG. 6 is a graph diagram of a particular illustrative embodiment of an output signal of a ring oscillator configuration.

Referring to FIG. 6, a graph illustrates an output of a ring oscillator when the ring oscillator transitions from a non-oscillating state to an oscillating state. For example, the ring oscillator may be configured according to the ring oscillator configuration 400 of FIG. 4, or the ring oscillator configuration 500 of FIG. 5. An x-axis 620 of a graph 600 represents time in nanoseconds and a y-axis 610 of the graph 600 represents voltage of an output signal 602 of the ring oscillator in millivolts. A segment 604 of the output signal 602 shows the output of the ring oscillator in a non-oscillating state prior to receiving an enable signal. The segment 606 of the output signal 602 shows the output of the ring oscillator in an oscillating state after receiving the enable signal. Although FIG. 6 illustrates particular valves of voltages and times, such values are provided for illustration and the disclosed systems may operate according to other conditions.

Figure 7:
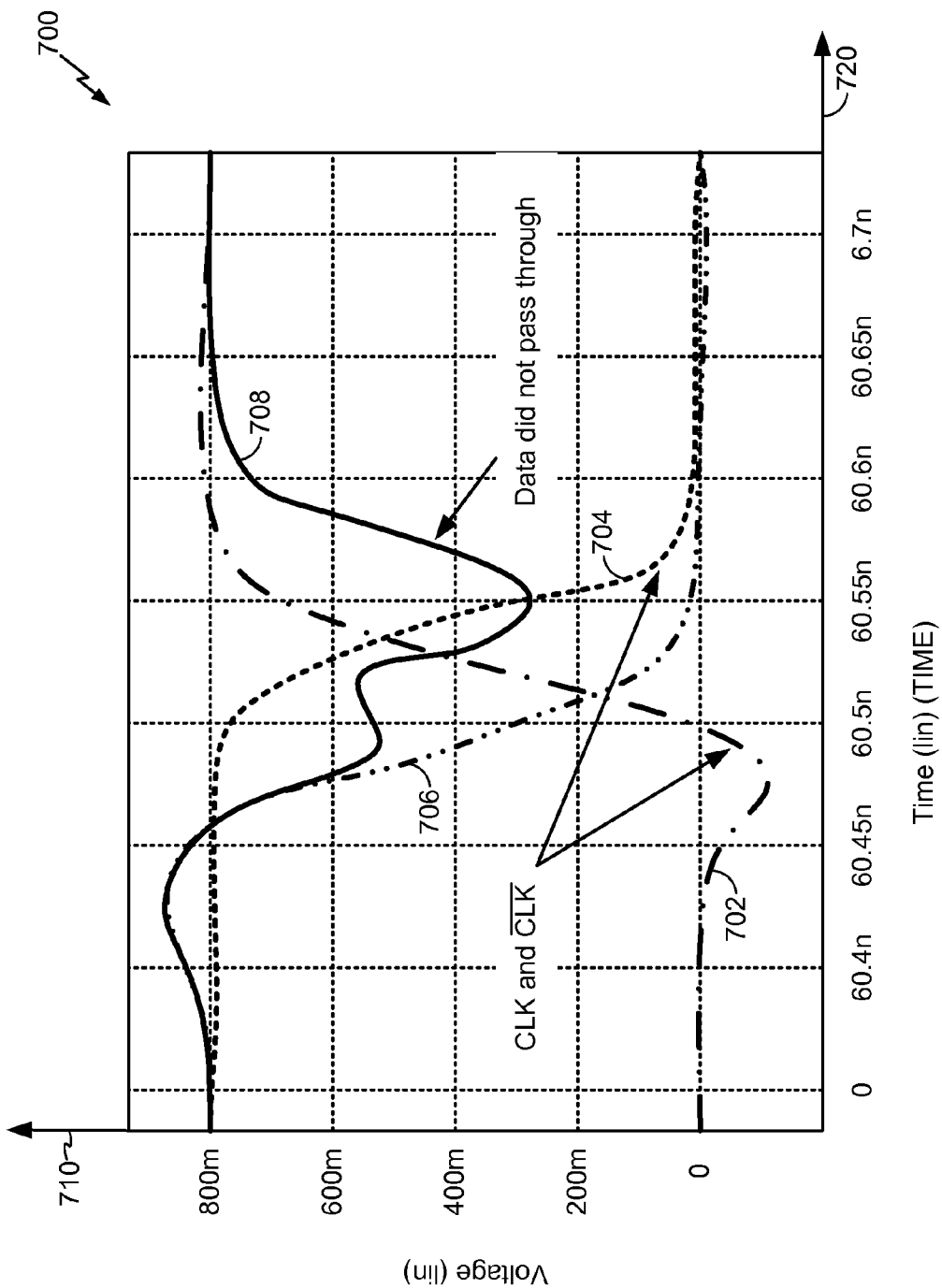
FIG. 7 is a graph diagram of a particular illustrative embodiment of a data, clock and, output signals of a racing path circuit.

Referring to FIG. 7, a graph illustrates a particular example of inputs and outputs of a racing path circuit when a race condition occurs. For example, the racing path circuit may be configured according to the racing path circuit 100 of FIG. 1, the racing path circuit 200 of FIG. 2, or the racing path circuit 300 of FIG. 3 as illustrative, non-limiting examples. An x-axis 720 of a graph 700 represents time in nanoseconds and a y-axis 710 of the graph 700 represents voltage of data, clock, and output signals in millivolts. The graph 700 of FIG. 7 illustrates a race condition of a racing path circuit. The race condition occurs when a clock signal 702 and an inverted clock signal 704 arrive at a pass gate, such as the signals 118 and 122 arriving at the pass gate 112 of FIG. 1, before a data signal 706 applied to the input of the pass gate has become stable on the output of the pass gate as evidenced by the failed transition of an output signal 708 of the pass gate.

Figure 8:
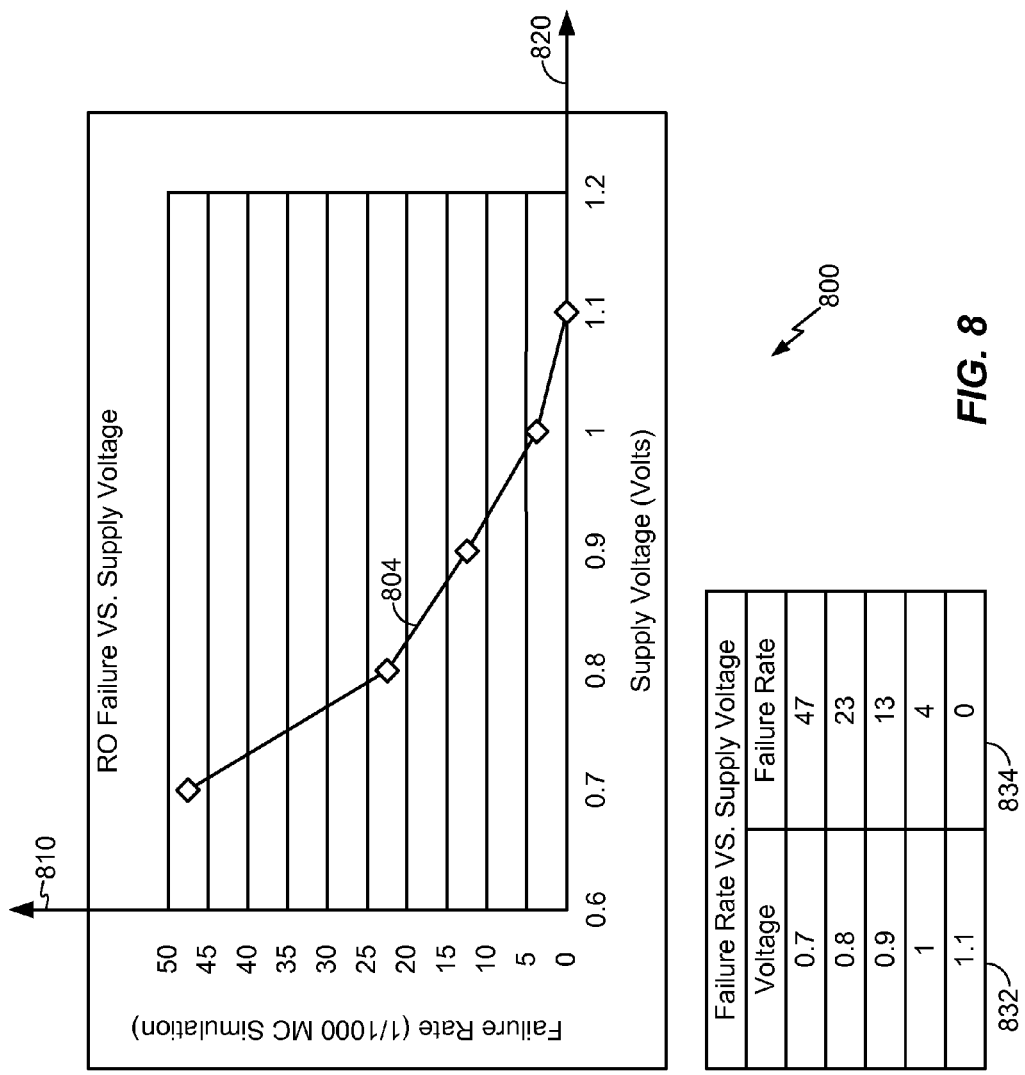
FIG. 8 is a graph diagram of a particular illustrative embodiment of racing path circuit failure rates for multiple dies versus supply voltage.

Race condition testing data may be collected and evaluated at various locations on a single die, for multiple dies, or for multiple dies from multiple wafers. Referring to FIG. 8, a graph illustrates an example of racing path circuit failure rates for multiple dies verses supply voltage, where a failure is identified by a race condition. For example, the racing path circuit may be configured according to the racing path circuit 100 of FIG. 1, the racing path circuit 200 of FIG. 2, or the racing path circuit 300 of FIG. 3, as illustrative, non-limiting examples. In a particular embodiment, the racing path circuits are in a ring oscillator configuration. An x-axis 820 of a graph 800 shows supply voltage in volts applied to the supply voltage of the ring oscillator circuits. A y-axis 810 corresponds to the number of failures per 1000 dies according to a Monte Carlo simulation utilizing parameters derived from racing path circuit testing data. As the supply voltage is decreased, the failure rate of the ring oscillator circuits begins to increase exponentially. A trend line 804 shows a correlation between supply voltage and race conditions due to local process variation. A column 832 provides the supply voltage levels and a column 834 provides the failure rate data used to generate the trend line 804. Higher failure rates at a particular voltage level indicate a more significant variation in process parameters. For example, if a second set of dies were tested and it was found that at 1.0 volt 20 ring oscillators in 1000 failed, then it could be determined that the local process variation of the second set of dies was greater than that of the first set, illustrated in the graph 800, which had a failure rate of only 4 ring oscillators out of 1000. Thus, a process variation may be measured or characterized based on race condition testing data, such as illustrated in FIG. 8.

Figure 9:
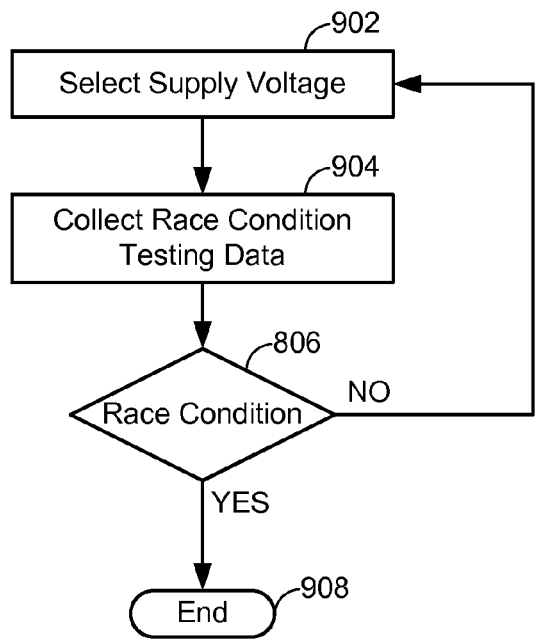
FIG. 9 is a flow chart of a particular illustrative embodiment of a method of characterizing a process variation.

Referring to FIG. 9, an illustrative method of collecting race condition testing data for a racing path circuit is depicted. For example, the racing path circuit may be configured according to the racing path circuit 100 of FIG. 1, the racing path circuit 200 of FIG. 2, or the racing path circuit 300 of FIG. 3. The method includes selecting a supply voltage level to be applied to the racing path circuit to generate race condition testing data, at 902. The supply voltage is applied to the racing path circuit and the race condition testing data is collected, at 904. The race condition testing data may include, but is not limited to, the applied supply voltage level, timing and voltage information for the input signal, and timing and voltage information for the output of the racing path circuit. The method further includes evaluating the collected race condition testing data to determine whether a race condition has occurred, at 906. If a race condition has not occurred, a new supply voltage is selected, at 902. If a race condition is detected, the testing of the racing path circuit ends, at 908.

Figure 10:
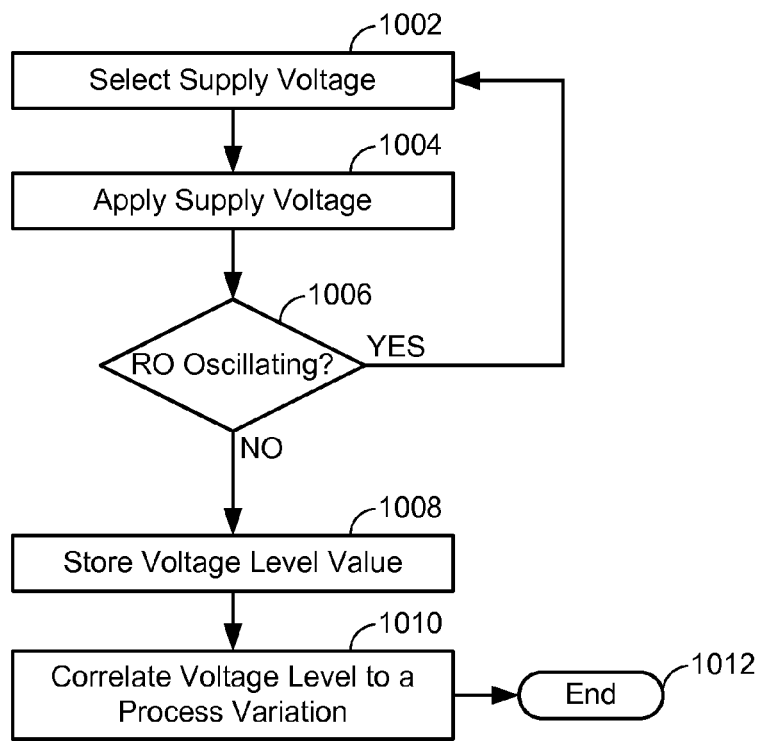
FIG. 10 is a flow chart of a second illustrative embodiment of a method of characterizing a process variation using a ring oscillator configuration.

Referring to FIG. 10, an illustrative method of collecting race condition testing data for a ring oscillator configuration having one or more racing path circuits is provided. As non-limiting examples, the ring oscillator may be configured according to the ring oscillator configuration 400 of FIG. 4 or the ring oscillator configuration 500 of FIG. 5. The method includes selecting a supply voltage level to be applied to the ring oscillator to generate race condition testing data, at 1002. The selected supply voltage is applied to the ring oscillator, at 1004. The output of the ring oscillator is monitored to determine whether the ring oscillator is in an oscillation state, at 1006. If the ring oscillator is in an oscillation state, the method returns to 1002 and a different supply voltage level is selected. If the ring oscillator is in a non-oscillation state, the supply voltage level value is collected, at 1008. The collected supply voltage level value may then be processed and correlated to a process variation, at 1010. At 1012, the method ends.

Figure 11:
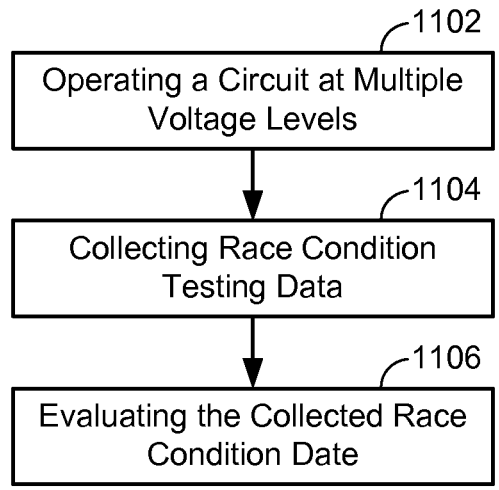
FIG. 11 is a flow chart of a third illustrative embodiment of a method of characterizing a process variation.

Referring to FIG. 11, a particular embodiment of a method is illustrated. The method includes operating a circuit at multiple supply voltage levels to generate race condition testing data, at 1102. The circuit may be disposed on at least one die of a wafer and the circuit includes at least one racing path circuit having at least two paths. For example, the at least one racing path circuit may be the racing path circuit 100 of FIG. 1, the racing path circuit 200 of FIG. 2, or the racing path circuit 300 of FIG. 3.

The method further includes collecting the race condition testing data, at 1104. In addition, the method further includes evaluating the collected race condition testing data, at 1106, to determine an approximate supply voltage level at which a race condition occurs for the circuit. The race condition testing data collected and evaluated by the testing method is correlated to a process variation of at least one die of the wafer. For example, by operating the circuit at multiple supply voltage levels, a supply voltage range in between which the race condition occurs, may be detected from an evaluation of the testing data.

For example, the circuit may include a ring oscillator that comprises at least one racing path circuit, and the ring oscillator may oscillate when the supply voltage is at a first level and the ring oscillator may stop oscillating when the supply voltage is reduced to a second level as a result of a race condition induced by the second voltage level. The first and second voltage levels and the corresponding oscillation states of the ring oscillator are collected and evaluated. The evaluation determines that the voltage at which a race condition occurs for the circuit on the particular die is at a supply voltage between the first level and the second level. The approximate supply voltage level at which a race condition occurs is identified by evaluating the collected race condition testing data and is directly or indirectly correlated with a local process variation in at least one die of the wafer.

In a particular embodiment, the at least two paths of the racing path circuit include a data path and a control path provided to a pass gate. As an example, the data path may be the first path 104 of the racing path circuit 100 of FIG. 1, and the control path may be the second path 106 of the racing path circuit 100. The first data path 104 may be a data path, and the second path 106 may function as a control path and carries the clock signal.

In a further example, a falling transition of an input signal sent via the at least two paths of the racing circuit passes through the racing path circuit 100 of FIG. 1. For example, a falling transition of an input signal 120 sent via the data path 104 passes through the racing path circuit 100 regardless of whether a race condition occurs. Further, a rising transition of the input signal sent via the at least two paths does not pass through the racing path circuit 100 when the race condition occurs. For example, the rising transition of the input signal 120 sent via the first data path 104 of the racing path circuit 100 may be blocked such that it does not pass through the racing path circuit upon occurrence of a race condition. As a further example, the clock signal from the inverter 124 may arrive at the pass gate 112 prior to, or too close in time to, the receipt of the output of the inverter 116 at the pass gate 112. When the input signal 120 has a rising transition, the clock signal from the inverter 124 disables the pass gate 112, thereby blocking the output of the inverter 116 from passing through the pass gate 112. Thus, a rising transition of the input signal 120 sent over the data path 104 may not pass through the racing path circuit 100 when a race condition occurs.

Alternatively, when a rising transition of an input signal is sent via the two paths of the racing circuit, the rising transition may pass through at least one racing path circuit. For example, when the rising transition of the input signal 120 of FIG. 1 is propagated over the first path 104 and the output of the inverter 116 arrives at the pass gate 112 prior to a clock transition from the inverter 124, a race condition does not occur and the data from the inverter 116 may successfully pass through the pass gate 112. Thus, a rising transition of the data signal sent via the data path 104 successfully passes through the racing circuit 100 when a race condition does not occur.

Referring to FIG. 1, even though the first path 104 has fewer gate delay elements than the second path 106, under certain conditions the signal propagated over the second path 106 may arrive before, or too close in time to, the signal propagated over the first path 104 thus causing a race condition. The signal arriving sooner over the second path 106 is caused by process variations that may occur on the same die or across multiple dies. The effects of process variation can become more pronounced as the gate sizes or device size is reduced, as the supply voltage to the circuit elements is reduced, or a combination thereof. When a race condition occurs as a result of a decrease in supply voltage, the signal on the first path 104 will not pass through the racing path circuit 100 when the digital signal 120 applied to the input 102 has a rising transition. The output 114 may be monitored to determine when a race condition occurs by detecting a failure of the output signal to transition appropriately when a rising transition is applied to the input 102. The racing path circuit 100 detects a race condition on a rising transition, but allows a falling transition to pass through the racing path circuit 100 despite the race condition.

Multiple supply voltage levels may be applied to the racing path circuit 100 to determine an approximate supply voltage at which a race condition occurs. For example, for an initial test of multiple tests, a voltage level of 1.0 volt may be applied to the positive power supply Vdd and Vss is grounded. A digital signal 120 having a rising transition is applied to the input 102. The output 114 is then monitored to determine whether a race condition has occurred. If a race condition does not occur, the positive power supply voltage Vdd may be lowered in increments to determine a voltage level at which a race condition occurs. For example, the supply voltage may be lowered in 100 millivolt (mV) increments resulting in a supply voltage of 0.9 volts for the second test. Assuming that a race condition does not occur at 0.9 volts, the supply voltage is then lowered to 0.8 volts. With the supply voltage set at 0.8 volts, a digital input signal 120 having a rising transition may be applied to the input 102 of the racing path circuit 100 and the output 114 is monitored to determine whether a race condition occurs. In a particular example, the signal on the output 114 does not transition appropriately with a supply voltage at 0.8 volts, indicating that a race condition has occurred. Thus, the approximate supply voltage at which a race condition occurs in this particular example is in a range between 0.8 volts and 0.9 volts.

The supply voltage may be lowered by any voltage increment to determine an approximate supply voltage level at which the race condition occurs. For example, the supply voltage may be lowered in increments of 200 mV, 100 mV, 50 mV, 10 mV, or 1 mV as illustrative non-limiting examples. A smaller increment may be used to determine a closer approximation of the supply voltage at which a race condition occurs for a particular racing path circuit.

In a particular embodiment, the size of the increments by which the supply voltage level is lowered is reduced in multiple test stages. For example, the first test stage may lower the supply voltage in 200 mV increments until it is determined that the race condition occurs between 0.8 volts and 0.6 volts. In a second test stage, the supply voltage level is set to 0.8 volts and lowered by increments of 100 mV until it is determined that the race condition occurs between 0.7 volts and 0.6 volts. In a third test stage, the supply voltage level is set to 0.7 volts and lowered by increments of 50 mV until it is determined that the race condition occurs between 0.65 volts and 0.6 volts. In a fourth test stage, the supply voltage level is set to 0.65 volts and lowered by increments of 10 mV until it is determined that the race condition occurs between 0.65 volts and 0.64 volts. This process may be continued to whatever level of granularity is desired for the approximation of the supply voltage at which the race condition occurs.

In a further example, referring to FIG. 2, a rising transition of an input signal sent via at least two paths of the racing path circuit passes through the racing path circuit 200. For example, a rising transition of an input signal 220 sent via the data path 204 passes through the racing path circuit 200 regardless of whether a race condition occurs. However, a falling transition of the input signal 220 sent via the at least two paths does not pass through the racing path circuit 200 when the race condition occurs. For example, the rising transition of the input signal 220 sent via the first data path 204 of the racing path circuit 200 may be blocked such that it does not pass through the racing path circuit upon occurrence of a race condition. As a further example, the clock signal 222 and the inverted clock signal from the inverter 224 may arrive at the pass gate 212 prior to, or too close in time to, the receipt of the output of the inverter 216 at the pass gate 212. When the input signal 220 has a falling transition, the clock signals, 222 and 224, disable the pass gate 212, thereby blocking the output of the inverter 216 from passing through the pass gate 212. Thus, a falling transition of the input signal 220 sent over the data path 204 may not pass through the racing path circuit 200 because a race condition has occurred.

Alternatively, when a race condition does not occur, a falling transition of an input signal sent via the two paths of the racing circuit passes through the at least one racing path circuit. For example, when the falling transition of the input signal 220 is propagated over the first path 204 and the output of the inverter 216 arrives at the pass gate 212 prior to the clock signals 222 and 224, a race condition does not occur and the signal from the inverter 216 may successfully pass through the pass gate 212. Thus, a falling transition of the data signal sent via the data path 204 successfully passes through the racing circuit 200 when a race condition does not occur.

In a further example, referring to FIG. 3, an input signal is applied to, and passed through to a multiplexer of the racing path circuit 300. For example, an input signal 320 is applied to the input 302 and provided to a first input of the multiplexer 318. An inverted version of the input signal 320 is provided from the output 310 of the inverter 308 to a second input of the multiplexer 318. A delayed version of the input signal 320 is provided to the input 304 of the racing path circuit 200 and to the input 306 of the racing path 100. The racing path circuits 100 and 200 function as described above with respect to FIGS. 1 and 2. For example, when a race condition is present in the racing path circuits 100 and 200 and the input signal 320 has a falling transition, the signal applied to the input 304 of the racing path circuit 200 does not pass through to the output 314. When the input signal 320 has a falling transition, the signal applied to the input 306 of racing path circuit 100 passes through to the output 316 regardless of whether there is a race condition. Thus, a race condition is detectable on a falling transition of the input signal 320 on the output 314 of the racing path circuit 200. The multiplexer 318 may be configured to provide at its output 330, the output 314 of the racing path circuit 200 when the input signal 320 has a falling transition.

Additionally, when a race condition is present in the racing path circuits 100 and 200 and the input signal 320 has a rising transition, the signal applied to the input 306 of the racing path circuit 100 does not pass through to the output 316. When the input signal 320 has a rising transition, the signal applied to the input of the racing path circuit 200 passes through to the output 314 regardless of whether there is a race condition. Thus, a race condition is detectable on a rising transition of the input signal 320 at the output 316 of the racing path circuit 100. The multiplexer 318 may be configured to provide at its output 330, the output 316 of the racing path circuit 100 when the input signal 320 has a rising transition. The multiplexer 318 may also be configured to bypass the racing path circuits 100 and 200 of FIG. 3 and provide the digital signal 320 at the output 330 of the multiplexer 318 or the multiplexer 318 may provide an inverted version of the digital input signal 320 at the output 330 of the multiplexer 318. These two bypass options may be useful when using the racing path circuit 300 in various test configurations (e.g., a ring oscillator configuration as shown in FIGS. 4 and 5).

Use of the method of testing a die of a wafer that includes racing path circuits and oscillating circuits as illustrated in FIG. 11 may provide a simplified method of identifying process variations of the die. For example, by providing different supply voltages to the racing circuit, the method of testing a wafer may identify process variations. Process variations may be implied or indicated by detecting race conditions of the racing path circuits at various supply voltages. One basis for the correlation between the racing path circuit measurements from the testing method and process variations is that circuits with racing paths are typically sensitive to local random process variation. Taking advantage of this sensitivity, the disclosed method may be used to measure local random process variation by measuring racing path conditions of such racing path circuits. Typically, the racing path circuit functions in a non-race condition scenario. However, when a local process variation is present, the circuit may function differently. For example, the ring oscillator may enter a non-oscillating state at a supply voltage level that would otherwise allow the ring oscillator to operate correctly.

In a particular illustrative embodiment, two paths of a racing path circuit are coupled to a pass gate. One path is a data path and the other path is a clock path. The signal along the data path tries to pass data through the pass gate and the signal along the clock path tries to close the pass gate. The data path is designed to be faster than the clock path. However, when local process variation is present, the clock signal can arrive sooner than, or too close in time to, the data signal under certain operating conditions. Under otherwise acceptable operating conditions, the pass gate in this scenario will be closed by the signal received from the clock path before the signal on the data path passes through the pass gate as a result of local process variation. In this situation, the racing path circuit behaves differently by not allowing the signal from the data path to pass through the circuit. The degree to which the circuit behaves differently than expected may indicate the degree of local process variation. A timing margin (e.g., the delay difference between the data path and the clock path to avoid a race condition) determines a magnitude of timing variation that the circuit can tolerate. The available timing margin may be reduced in the presence of local process variation based on the degree of variation. Thus, the timing margin may be used as an indicator of the corresponding local process variation. In addition, a required timing margin to avoid a race condition may vary as a function of supply voltage. With no process variation among the racing path circuits, the race condition would occur at approximately the same supply voltage level in each racing path circuit (assuming that the tests were performed at the same temperature). However, because there is process variation among racing path circuits, the magnitude of the variation may be determined based on the supply voltage at which the race condition occur for each of the racing path circuits. Thus, by performing a method of testing the racing path circuits at different supply voltages, data may be collected and evaluated to characterize a process variation of the die of the wafer based on the determined approximate supply voltage at which a race condition occurs.

Figure 12:
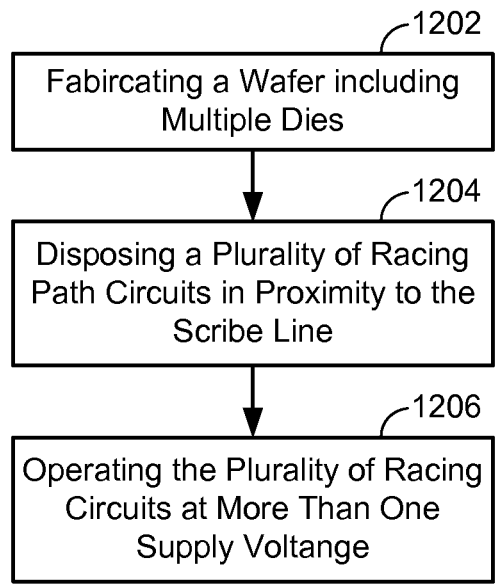
FIG. 12 is a flow chart of a particular illustrative embodiment of a method of fabricating a racing path circuit.

In a particular illustrative embodiment, a method of fabricating a wafer to include a racing path circuit is illustrated. Referring to FIG. 12, the method includes fabricating a wafer including multiple dies where at least two of the multiple dies define a scribe line, at 1202. The method further includes disposing one or more racing path circuits in proximity to the scribe line, at 1204. An example of a racing path circuit disposed in proximity to scribe lines is described with respect to FIG. 13.

In a particular embodiment, the one or more racing path circuits are disposed on the scribe line. In a further embodiment, the racing path circuit is disposed closer to the scribe line than to a center of the die. In a further embodiment, the racing path circuit is disposed within a distance from an edge of the die as a function of a percentage of the total width of the die. For example, if the racing path circuit is disposed within a distance from the edge of the die that is 10 percent of the total width of the die, then the racing path circuit would be disposed within 100 micrometers of an edge of a die that is 1 millimeter wide. Although placing the racing path circuit along the edge of the scribe line may facilitate testing for certain test configurations, in other embodiments the one or more racing paths circuits may be disposed at one or more other locations on the die.

At 1206, the one or more racing path circuits are configured to operate at multiple supply voltage levels to generate race condition testing data. The one or more racing path circuits include at least two paths. For example, a representative racing path circuit may include a data path and a control path. Each of the data path and the control path may send signals to a pass gate and a race condition may be detected by the racing path circuits. For example, the racing path circuits may include the racing path circuit 100 of FIG. 1, the racing path circuit 200 of FIG. 2, the racing path circuit 300 of FIG. 3, or any combination thereof.

Figure 13:
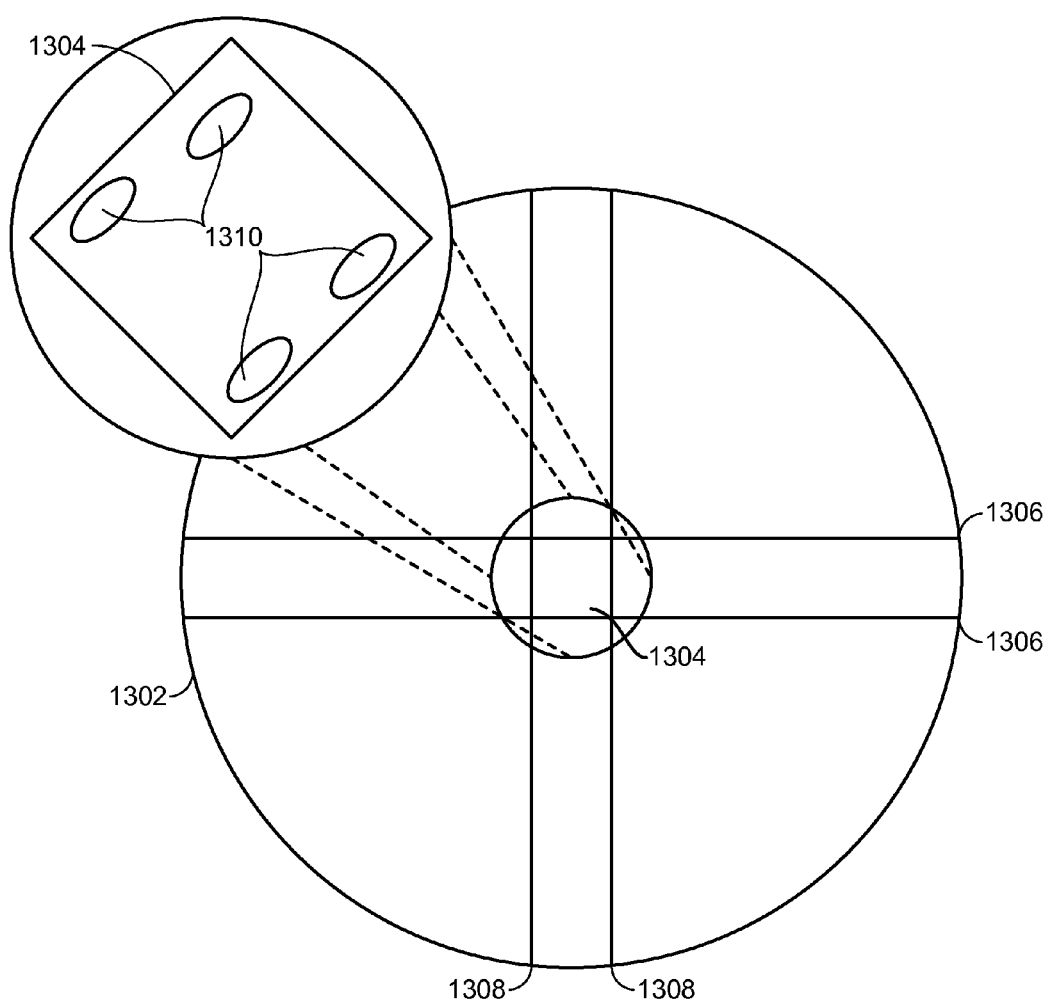
FIG. 13 is a diagram of a particular illustrative embodiment of a semiconductor wafer including at least one racing path circuit disposed on the wafer.

Referring to FIG. 13, a semiconductor wafer 1302 is illustrated including at least one die 1304 defined by horizontal scribe lines 1306 and vertical scribe lines 1308. Wafer 1302 may include multiple die of the same size or varying sizes. Die 1304 includes at least one or more racing path circuits 1310 disposed near the edge of the die 1304. Alternatively, the racing path circuits 1310 may be disposed anywhere on the die 1304, or on the scribe lines. The at least one racing path circuit 1310 may be the racing path circuit 100 of FIG. 1, the racing path circuit 200 of FIG. 2, or the racing path circuit 300 of FIG. 3 as illustrative, non-limiting examples. Additionally, the racing path circuit 1310 may be a ring oscillator configured according to the ring oscillator configuration 400 of FIG. 4, or the ring oscillator configuration 500 of FIG. 5. The racing path circuit 1310 may be only a small portion of the die 1304. The die 1304 may include additional circuitry unrelated to the function of the racing path circuits.

Figure 14:
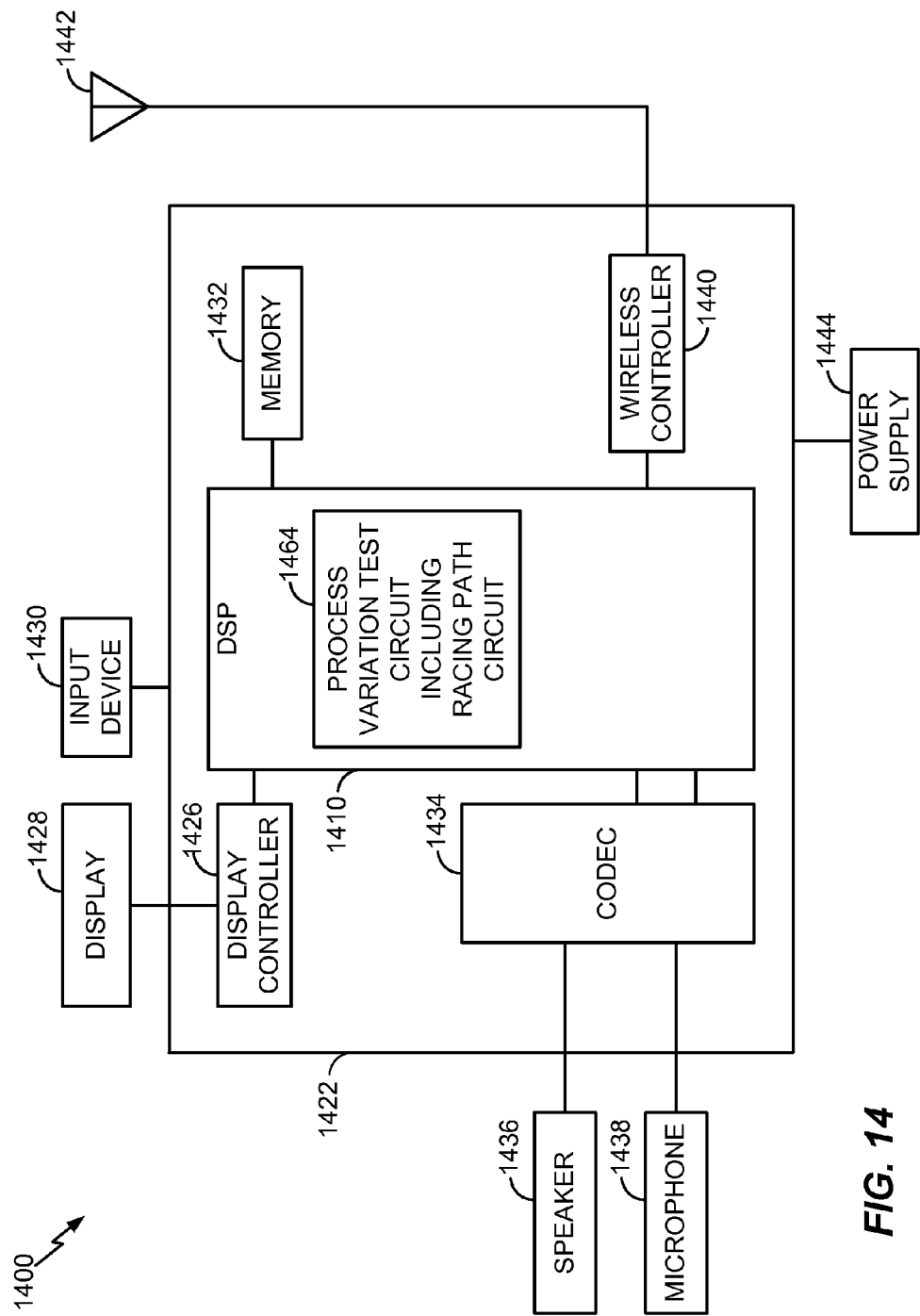
FIG. 14 is a block diagram of a particular illustrative embodiment of an electronic device including a racing path circuit for characterizing a local process variation.

Referring to FIG. 14, a block diagram of a particular illustrative embodiment of an electronic device including a racing path circuit for characterizing a local process variation, is depicted and generally designated 1400. The device 1400 includes a processor, such as a digital signal processor (DSP) 1410, coupled to a memory 1432 and also coupled to a process variation test circuit including the racing path circuit 1464. In an illustrative example, the process variation test circuit including the racing path circuit 1464 may be the racing path circuit 100 of FIG. 1, the racing path circuit 200 of FIG. 2, or the racing path circuit 300 of FIG. 3. Additionally, the process variation test circuit including the racing path circuit 1464 may be a ring oscillator configured according to the ring oscillator configuration 400 of FIG. 4, or the ring oscillator configuration 500 of FIG. 5.

FIG. 14 also shows a display controller 1426 that is coupled to the digital signal processor 1410 and to a display 1428. A coder/decoder (CODEC) 1434 can also be coupled to the digital signal processor 1410. A speaker 1436 and a microphone 1438 can be coupled to the CODEC 1434.

FIG. 14 also indicates that a wireless controller 1440 can be coupled to the digital signal processor 1410 and to a wireless antenna 1442. In a particular embodiment, the DSP 1410, the display controller 1426, the memory 1432, the CODEC 1434, the wireless controller 1440, and the racing path circuit 1464 are included in a system-in-package or system-on-chip device 1422. In a particular embodiment, an input device 1430 and a power supply 1444 are coupled to the system-on-chip device 1422. Moreover, in a particular embodiment, as illustrated in FIG. 14, the display 1428, the input device 1430, the speaker 1436, the microphone 1438, the wireless antenna 1442, and the power supply 1444 are external to the system-on-chip device 1422. However, each of the display 1428, the input device 1430, the speaker 1436, the microphone 1438, the wireless antenna 1442, and the power supply 1444 can be coupled to a component of the system-on-chip device 1422, such as an interface or a controller.

Figure 15:
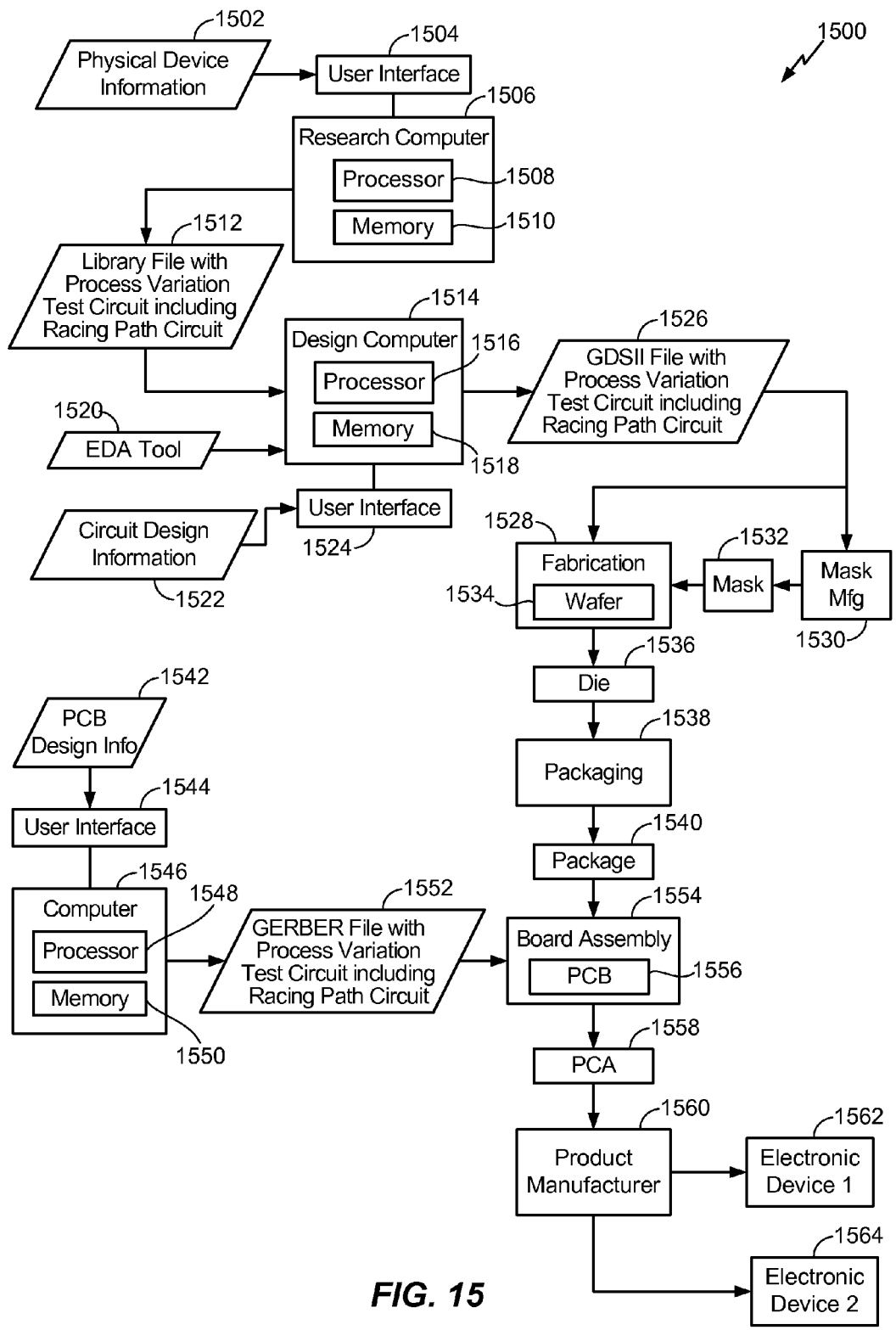
FIG. 15 is a data flow diagram of a particular illustrative embodiment of a manufacturing process to manufacture electronic devices that include a circuit to generate race condition test data at multiple supply voltages.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above. FIG. 15 depicts a particular illustrative embodiment of an electronic device manufacturing process 1500.

Physical device information 1502 is received in the manufacturing process 1500, such as at a research computer 1506. The physical device information 1502 may include design information representing at least one physical property of a semiconductor device, such as the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof. For example, the physical device information 1502 may include physical parameters, material characteristics, and structure information that is entered via a user interface 1504 coupled to the research computer 1506. The research computer 1506 includes a processor 1508, such as one or more processing cores, coupled to a computer readable medium such as a memory 1510. The memory 1510 may store computer readable instructions that are executable to cause the processor 1508 to transform the physical device information 1502 to comply with a file format and to generate a library file 1512.

In a particular embodiment, the library file 1512 includes at least one data file including transformed design information. For example, the library file 1512 may include a library of semiconductor devices including the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof, that is provided for use with an electronic design automation (EDA) tool 1520.

The library file 1512 may be used in conjunction with the EDA tool 1520 at a design computer 1514 including a processor 1516, such as one or more processing cores, coupled to a memory 1518. The EDA tool 1520 may be stored as processor executable instructions at the memory 1518 to enable a user of the design computer 1514 to design a circuit using the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof, of the library file 1512. For example, a user of the design computer 1514 may enter circuit design information 1522 via a user interface 1524 coupled to the design computer 1514. The circuit design information 1522 may include design information representing at least one physical property of a semiconductor device, such as the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof. To illustrate, the circuit design information may include identification of particular circuits and relationships to other elements in a circuit design, positioning information, feature size information, interconnection information, or other information representing a physical property of a semiconductor device.

The design computer 1514 may be configured to transform the design information, including the circuit design information 1522 to comply with a file format. To illustrate, file formation may include a database binary file format representing planar geometric shapes, text labels, and other information about a circuit layout in a hierarchical format, such as a Graphic Data System (GDSII) file format. The design computer 1514 may be configured to generate a data file including the transformed design information, such as a GDSII file 1526 that includes information describing the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof, in addition to other circuits or information. To illustrate, the data file may include information corresponding to a system-on-chip (SOC) that includes the racing path circuit 100 of FIG. 1 and that also includes additional electronic circuits and components within the SOC.

The GDSII file 1526 may be received at a fabrication process 1528 to manufacture the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof, according to transformed information in the GDSII file 1526. For example, a device manufacture process may include providing the GDSII file 1526 to a mask manufacturer 1530 to create one or more masks, such as masks to be used for photolithography processing, illustrated as a representative mask 1532. The mask 1532 may be used during the fabrication process to generate one or more wafers 1534, which may be tested and separated into dies, such as a representative die 1536. The die 1536 includes a circuit including the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof.

For example, the fabrication process 1528 may includes one or more computers, such as test devices or other electronic devices that can execute software. The fabrication process 1528 may also include a computer readable tangible medium, such as a computer memory device, storing instructions executable by the computer to operate a circuit at multiple supply voltage levels to generate race condition testing data. The circuit may be disposed on at least one die of a wafer and may include at least one racing path circuit that has at least two paths. The instructions may be executable by the computer to collect the race condition testing data and to evaluate the collected race condition testing data. The race condition testing data may be correlated to a process variation of the at least one die. As an example, the circuit may include a ring oscillator, such as illustrated in FIG. 4 or 5, and the instructions may be executable by the computer to detect the race condition when the ring oscillator transitions from an oscillating state to a non-oscillating state. A process variation of the die may therefore be characterized at the fabrication process 1528 based on the race condition testing data.

The die 1536 may be provided to a packaging process 1538 where the die 1536 is incorporated into a representative package 1540. For example, the package 1540 may include the single die 1536 or multiple dies, such as a system-in-package (SiP) arrangement. The package 1540 may be configured to conform to one or more standards or specifications, such as Joint Electron Device Engineering Council (JEDEC) standards.

Information regarding the package 1540 may be distributed to various product designers, such as via a component library stored at a computer 1546. The computer 1546 may include a processor 1548, such as one or more processing cores, coupled to a memory 1550. A printed circuit board (PCB) tool may be stored as processor executable instructions at the memory 1550 to process PCB design information 1542 received from a user of the computer 1546 via a user interface 1544. The PCB design information 1542 may include physical positioning information of a packaged semiconductor device on a circuit board, the packaged semiconductor device corresponding to the package 1540 including the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof.

The computer 1546 may be configured to transform the PCB design information 1542 to generate a data file, such as a GERBER file 1552 with data that includes physical positioning information of a packaged semiconductor device on a circuit board, as well as layout of electrical connections such as traces and vias, where the packaged semiconductor device corresponds to the package 1540 including the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof. In other embodiments, the data file generated by the transformed PCB design information may have a format other than a GERBER format.

The GERBER file 1552 may be received at a board assembly process 1554 and used to create PCBs, such as a representative PCB 1556, manufactured in accordance with the design information stored within the GERBER file 1552. For example, the GERBER file 1552 may be uploaded to one or more machines for performing various steps of a PCB production process. The PCB 1556 may be populated with electronic components including the package 1540 to form a represented printed circuit assembly (PCA) 1558.

The PCA 1558 may be received at a product manufacture process 1560 and integrated into one or more electronic devices, such as a first representative electronic device 1562 and a second representative electronic device 1564. As an illustrative, non-limiting example, the first representative electronic device 1562, the second representative electronic device 1564, or both, may be selected from the group of a set top box, a music player, a video player, an entertainment unit, a navigation device, a communications device, a personal digital assistant (PDA), a fixed location data unit, and a computer. As another illustrative, non-limiting example, one or more of the electronic devices 1562 and 1564 may be remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-5 and 14-15 may illustrate remote units according to the teachings of the disclosure, the disclosure is not limited to these exemplary illustrated units. Embodiments of the disclosure may be suitably employed in any device that includes active integrated circuitry including memory and on-chip circuitry.

Thus, the racing path circuit 100 of FIG. 1, the racing path circuit 200 of FIG. 2, the racing path circuit 300 of FIG. 3, the ring oscillator configuration 400 of FIG. 4, the ring oscillator configuration 500 of FIG. 5, or any combination thereof, may be fabricated, processed, and incorporated into an electronic device, as described in the illustrative process 1500. One or more aspects of the embodiments disclosed with respect to FIGS. 1-5 and 14-15 may be included at various processing stages, such as within the library file 1512, the GDSII file 1526, and the GERBER file 1552, as well as stored at the memory 1510 of the research computer 1506, the memory 1518 of the design computer 1514, the memory 1550 of the computer 1546, the memory of one or more other computers or processors (not shown) used at the various stages, such as at the board assembly process 1554, and also incorporated into one or more other physical embodiments such as the mask 1532, the die 1536, the package 1540, the PCA 1558, other products such as prototype circuits or devices (not shown), or any combination thereof. Although various representative stages of production from a physical device design to a final product are depicted, in other embodiments fewer stages may be used or additional stages may be included. Similarly, the process 1500 may be performed by a single entity, or by one or more entities performing various stages of the process 1500.

Those of skill would further appreciate that the various illustrative logical blocks, configurations, modules, circuits, and algorithm steps described in connection with the embodiments disclosed herein may be implemented as electronic hardware, computer software executed by a processing unit, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
operating, via a processor, a circuit at multiple supply voltage levels to generate race condition testing data, wherein the circuit is disposed on at least one die of a wafer, the circuit comprising at least one racing path circuit that comprises at least two paths, wherein a signal applied to the at least two paths races to a pass gate;
collecting the race condition testing data and
evaluating the collected race condition testing data to determine at least one supply voltage level at which a race condition occurs, wherein the race condition testing data is correlated to a process variation of the at least one die.

2. The method of claim 1, wherein the at least two paths include a data path and a control path.

3. The method of claim 2, wherein the race condition testing is associated with the data path and the control path.

4. The method of claim 1, wherein a falling transition of a data signal sent via one of the at least two paths passes through the at least one racing path circuit, and wherein a rising transition of the data signal sent via one of the at least two paths does not pass through the at least one racing path circuit when the race condition occurs.

5. The method of claim 1, wherein the circuit includes a ring oscillator.

6. The method of claim 5, further comprising detecting the race condition when the ring oscillator transitions from an oscillating state to a non-oscillating state.

7. The method of claim 5, wherein the ring oscillator includes a plurality of racing path circuits, and wherein the multiple supply voltage levels are applied to the ring oscillator until the ring oscillator transitions from an oscillating state to a non-oscillating state.

8. The method of claim 1, wherein a first path of the at least two paths includes a first number of delay elements having first characteristics, wherein a second path of the at least two paths includes a second number of delay elements having second characteristics, and wherein the second number of delay elements is greater than the first number of delay elements.

9. The method of claim 8, wherein the first characteristics correspond to at least one of a size or a threshold voltage of each delay element of the first number of delay elements, and wherein the second characteristics correspond to at least one of a size or a threshold voltage of each delay element of the second number of delay elements.

10. The method of claim 8, wherein the first number of delay elements, the first characteristics, the second number of delay elements, and the second characteristics correspond to a particular process variation of the at least one die.

11. A method comprising:
fabricating a wafer comprising multiple dies, wherein at least two of the multiple dies define a scribe line; and
disposing a plurality of racing path circuits in proximity to the scribe line, wherein at least one racing path circuit is configured to operate at multiple supply voltage levels to generate race condition testing data, wherein the at least one racing path circuit includes at least two paths, and wherein a signal applied to the at least two paths races to a pass gate.

12. The method of claim 11, wherein the at least one racing path circuit is disposed in a ring oscillator configuration.

13. The method of claim 11, wherein outputs of each of the plurality of racing path circuits are inverted.

14. The method of claim 11, further comprising operating the plurality of racing path circuits in a ring oscillator configuration at more than one supply voltage level.

15. The method of claim 11, wherein the at least one racing path circuit is disposed closer to the scribe line than to a center of a particular die of the at least two of the multiple dies.

16. An apparatus comprising:
at least one racing path circuit, wherein the at least one racing path circuit comprises:
a first path, the first path comprising at least one gate delay element;
a second path, wherein the second path includes at least one more gate delay element than the first path; and
a pass gate coupled to the first path and to the second path, wherein the at least one racing path circuit is configured such that a signal applied to the first path and to the second path races to the pass gate while a supply voltage is applied to the at least one racing path circuit and wherein the at least one racing path circuit is a component of a ring oscillator that is operable in an oscillation state at a first supply voltage and is in a non-oscillation state at a second supply voltage.

17. The apparatus of claim 16, wherein the at least one racing path circuit includes a first racing path circuit and a second racing path circuit.

18. The apparatus of claim 17, wherein the first racing path circuit tests a rising transition and the second racing path circuit tests a falling transition.

19. The apparatus of claim 18, further comprising a multiplexer coupled to the first racing path circuit and the second racing path circuit.

20. The apparatus of claim 16, wherein the second supply voltage indicates a race condition.

21. The apparatus of claim 20, wherein the second supply voltage is correlated to a local processing variation parameter.

22. The apparatus of claim 16, wherein the at least one racing path circuit is integrated in at least one semiconductor die.

23. The apparatus of claim 16, further comprising a device selected from the group consisting of a set top box, a music player, a video player, an entertainment unit, a navigation device, a communications device, a personal digital assistant (PDA), a fixed location data unit, and a computer, into which the at least one racing path circuit is integrated.

24. An apparatus comprising:
means for operating a circuit at multiple supply voltage levels to generate race condition testing data, wherein the circuit is disposed on at least one die of a wafer, the circuit comprising at least one racing path circuit that comprises at least two paths, wherein a signal applied to the at least two paths races to a pass gate;
means for collecting the race condition testing data; and
means for evaluating the collected race condition testing data to determine at least one supply voltage level at which a race condition occurs, wherein the race condition testing data is correlated to a process variation of the at least one die.

25. The apparatus of claim 24, wherein a falling transition of a data signal sent via one of the at least two paths basses through the at least one racing path circuit, and wherein a rising transition of the data signal sent via one of the at least two paths does not pass through the at least one racing path circuit when the race condition occurs.

26. The apparatus of claim 24, wherein the circuit includes a ring oscillator.

27. The apparatus of claim 26, further comprising means for detecting the race condition when the ring oscillator transitions from an oscillating state to a non-oscillating state.

28. The apparatus of claim 26, wherein the ring oscillator includes a plurality of racing path circuits, and wherein the multiple supply voltage levels are applied to the ring oscillator until the ring oscillator transitions from an oscillating state to a non-oscillating state.

29. The apparatus of claim 24, wherein the at least two paths include a data path and a control path.

30. The apparatus of claim 29, wherein the race condition is associated with the data path and the control path.

31. A non-transitory computer readable medium storing instructions that, when executable by a processor, cause the processor to:
operate a circuit at multiple supply voltage levels to generate race condition testing data, wherein the circuit is disposed on at least one die of a wafer, the circuit comprising at least one racing path circuit that comprises at least two paths, wherein a signal applied to the at least two paths races to a pass gate;
collect the race condition testing data; and
evaluate the collected race condition testing data to determine at least one supply voltage level at which a race condition occurs, wherein the race condition testing data is correlated to a process variation of the at least one die.

32. The non-transitory computer readable medium of claim 31, wherein the processor is integrated in a device selected from the group consisting of a set top box, a music player, a video player, an entertainment unit, a navigation device, a communications device, a personal digital assistant (PDA), a fixed location data unit, and a computer.

33. The non-transitory computer readable medium of claim 31, wherein the circuit includes a ring oscillator.

34. The non-transitory computer readable medium of claim 33, further comprising instructions that are executable by the processor to detect the race condition when the ring oscillator transitions from an oscillating state to a non-oscillating state.

35. The non-transitory computer readable medium of claim 33, wherein the ring oscillator includes a plurality of racing path circuits, and wherein the multiple supply voltage levels are applied to the ring oscillator until the ring oscillator transitions from an oscillating state to a non-oscillating state.

36. The non-transitory computer readable medium of claim 31, wherein the at least two paths include a data path and a control path.

37. The non-transitory computer readable medium of claim 31, wherein a falling transition of a data signal sent via one of the at least two paths passes through the at least one racing path circuit, and wherein a rising transition of the data signal sent via one of the at least two paths does not pass through the at least one racing path circuit when the race condition occurs.

38. A method comprising:
receiving, by a computing device, design information representing at least one physical property of a semiconductor device, the semiconductor device comprising:
at least one racing path circuit, wherein the at least one racing path circuit comprises:
a first path, the first path comprising at least one gate delay element;
a second path, wherein the second path includes at least one more gate delay element than the first path; and
a pass gate coupled to the first path and to the second path, wherein the at least one racing path circuit is configured such that a signal applied to the first path and to the second path races to the pass gate while a supply voltage is applied to the at least one racing path circuit and wherein the at least one racing path circuit is a component of a ring oscillator that is operable in an oscillation state at a first supply voltage and is in a non-oscillation state at a second supply voltage;
transforming, by the computing device, the design information to comply with a file format; and
generating, by the computing device, a data file including the transformed design information.

39. The method of claim 38, wherein the data file includes a GDSII format.

40. A method comprising:
receiving, by a computing device, a data file comprising design information corresponding to a semiconductor device; and
fabricating, by the computing device, the semiconductor device according to the design information, wherein the semiconductor device comprises:
at least one racing path circuit, wherein the at least one racing path circuit comprises:
a first path, the first path comprising at least one gate delay element;
a second path, wherein the second path includes at least one more gate delay element than the first path; and
a pass gate coupled to the first path and to the second path, wherein the at least one racing path circuit is configured such that a signal applied to the first path and to the second path races to the pass gate while a supply voltage is applied to the at least one racing path circuit, and wherein the at least one racing path circuit is a component of a ring oscillator that is operable in an oscillation state at a first supply voltage and is in a non-oscillation state at a second supply voltage.

41. The method of claim 40, wherein the data file has a GDSII format.

42. A method comprising:
receiving, by a computing device, design information comprising physical positioning information of a packaged semiconductor device on a circuit board, the packaged semiconductor device comprising:
at least one racing path circuit, wherein the at least one racing path circuit comprises:
a first path, the first path comprising at least one gate delay element;
a second path, wherein the second path includes at least one more gate delay element than the first path; and
a pass gate coupled to the first path and to the second path, wherein the at least one racing path circuit is configured such that a signal applied to the first path and to the second path races to the pass gate while a supply voltage is applied to the at least one racing path circuit, and wherein the at least one racing path circuit is a component of a ring oscillator that is operable in an oscillation state at a first supply voltage and is in a non-oscillation state at a second supply voltage; and
transforming, by the computing device, the design information to generate a data file.

43. The method of claim 42, wherein the data file has a GERBER format.

44. A method comprising:
receiving, by a computing device, a data file comprising design information comprising physical positioning information of a packaged semiconductor device on a circuit board; and
manufacturing, by the computing device, the circuit board configured to receive the packaged semiconductor device according to the design information, wherein the packaged semiconductor device comprises:
at least one racing path circuit, wherein the at least one racing path circuit comprises:
a first path, the first path comprising at least one gate delay element;
a second path, wherein the second path includes at least one more gate delay element than the first path; and
a pass gate coupled to the first path and to the second path, wherein the at least one racing path circuit is configured such that a signal applied to the first path and to the second path races to the pass gate while a supply voltage is applied to the at least one racing path circuit and wherein the at least one racing path circuit is a component of a ring oscillator that is in an oscillation state at a first supply voltage and is in a non-oscillation state at a second supply voltage.

45. The method of claim 44, wherein the data file has a GERBER format.

46. The method of claim 44, further comprising integrating the circuit board into a device selected from the group consisting of a set top box, a music player, a video player, an entertainment unit, a navigation device, a communications device, a personal digital assistant (PDA), a fixed location data unit, and a computer.

* * * * *